US010977373B2

(12) United States Patent
Nakano et al.

(10) Patent No.: US 10,977,373 B2
(45) Date of Patent: Apr. 13, 2021

(54) EVALUATION DEVICE, EVALUATION SYSTEM, AND EVALUATION METHOD

(71) Applicant: Panasonic Intellectual Property Corporation of America, Torrance, CA (US)

(72) Inventors: Toshihisa Nakano, Osaka (JP); Jun Anzai, Kanagawa (JP); Tohru Wakabayashi, Hyogo (JP); Kimio Minami, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 141 days.

(21) Appl. No.: 15/922,970

(22) Filed: Mar. 16, 2018

(65) Prior Publication Data

US 2018/0204011 A1 Jul. 19, 2018

Related U.S. Application Data

(63) Continuation of application No. PCT/JP2016/004892, filed on Nov. 16, 2016.

(30) Foreign Application Priority Data

Dec. 14, 2015 (JP) ............................. JP2015-243433
Oct. 12, 2016 (JP) ............................. JP2016-201242

(51) Int. Cl.
*G06F 21/00* (2013.01)
*G06F 21/57* (2013.01)
(Continued)

(52) U.S. Cl.
CPC ............ *G06F 21/577* (2013.01); *B60R 16/02* (2013.01); *B60R 16/023* (2013.01);
(Continued)

(58) Field of Classification Search
CPC ............ G06F 21/577; G06F 2221/034; G06F 21/567; G06F 2221/2101; G06F 21/85; B60R 16/023; B60R 16/02
See application file for complete search history.

(56) References Cited

U.S. PATENT DOCUMENTS

| 10,146,893 B1* | 12/2018 | Evans ..................... G06F 30/20 |
| 2010/0322298 A1* | 12/2010 | Hisakado ................ H04L 9/003 |
| | | 375/227 |

(Continued)

FOREIGN PATENT DOCUMENTS

JP 2015-114833 6/2015

OTHER PUBLICATIONS

Masaya Yoshikawa, Kyota Sugioka, Yusuke Nozaki and Kensaku Asahi, "Secure in-vehicle systems against Trojan attacks", 2015 IEEE/ACIS 14th International Conference on Computerand Information Science (ICIS), pp. 1-5. (Year: 2015).*

(Continued)

*Primary Examiner* — Joseph P Hirl
*Assistant Examiner* — Chi D Nguy
(74) *Attorney, Agent, or Firm* — Greenblum & Bernstein, P.L.C.

(57) ABSTRACT

An evaluation device for evaluating security of an electronic control system in which a plurality of electronic control units are connected to a bus used for communication includes a recording medium that holds attack procedure information indicative of contents and a transmission order of a plurality of frames, a transmitter that transmits the plurality of frames to the bus in the transmission order indicated by the attack procedure information, a monitor that monitors an actuator unit controlled by any of the plurality of electronic control units, and an evaluator that makes the evaluation on basis of a monitoring result obtained by the (Continued)

monitor when the transmitter transmits the plurality of frames to the bus.

15 Claims, 14 Drawing Sheets

(51) Int. Cl.
  *B60R 16/023* (2006.01)
  *B60R 16/02* (2006.01)
  *G06F 21/85* (2013.01)
  *G06F 21/56* (2013.01)
(52) U.S. Cl.
  CPC ............ *G06F 21/567* (2013.01); *G06F 21/85* (2013.01); *G06F 2221/034* (2013.01); *G06F 2221/2101* (2013.01)

(56) References Cited

U.S. PATENT DOCUMENTS

| | | | |
|---|---|---|---|
| 2015/0067864 A1* | 3/2015 | Barkan | G06F 21/561 726/24 |
| 2018/0159895 A1* | 6/2018 | Ma | H04L 29/06 |
| 2018/0196941 A1* | 7/2018 | Ruvio | H04W 12/1202 |

OTHER PUBLICATIONS

International Search Report of PCT application No. PCT/JP2016/004892 dated Dec. 13, 2016.

Takeshi Kishikawa et al., "Proposal of Security ECU to Protect In-Vehicle Network: Updatable CAN Protection Method using HW/SW Cooperation and Evaluation of the Method", SCIS 2015, Jan. 20-23, 2015.

Tsutomu Matsumoto et al., "A Method of Fuzzing through Controller Area Network", SCIS 2015, Jan. 20-23, 2015.

The Extended European Search Report dated Nov. 13, 2018 for the related European Patent Application No. 16875096.6.

Johannes Weschke et al: "Testing and Evaluation to Improve Data Security of Automotive Embedded Systems Master's thesis in Computer Systems & Networks", Jul. 14, 2015 (Jul. 14, 2015), XP055393348, Retrieved from the Internet: URL:http://publications.lib.chalmers.se/records/fulltext/219731/219731.pdf [retrieved on Jul. 24, 2017].

Stephanie Bayer et al: "Automotive Security Testing—The Digital Crash Test" In: "Energy Consumption and Autonomous Driving", Sep. 20, 2015 (Sep. 20, 2015), Springer International Publishing, Cham, XP055518227.

* cited by examiner

FIG. 7

| FUNCTION TO BE EVALUATED | TRANSMITTED MESSAGE | MESSAGE ID | DATA CONTENTS | TRANSMISSION INTERVAL | TRANSMISSION ORDER |
|---|---|---|---|---|---|
| PARKING ASSISTANCE FUNCTION | SHIFT POSITION | 0x0123 | "REVERSE" | 20 ms | 1 |
| | VEHICLE SPEED | 0x0034 | "6 km/h" | 20 ms | 2 |
| | STEERING OPERATING INSTRUCTION | 0x0256 | FLAG "1" "RIGHTWARD ROTATION BY 15 DEGREES" | 20 ms | 3 |
| LANE KEEPING ASSISTANCE FUNCTION | VEHICLE SPEED | 0x0034 | "70 km/h" | 10 ms | 1 |
| | WHITE LINE DETECTION | 0x0456 | "DEVIATION" | 10 ms | 2 |
| | STEERING OPERATING INSTRUCTION | 0x0256 | FLAG "1" "LEFTWARD ROTATION BY 5 DEGREES" | 10 ms | 3 |
| COLLISION AVOIDANCE ASSISTANCE FUNCTION | VEHICLE SPEED | 0x0034 | "20 km/h" | 10 ms | 1 |
| | OBSTACLE DETECTION | 0x0521 | "PRESENCE OF OBSTACLE" | 10 ms | 2 |
| | BRAKE OPERATING INSTRUCTION | 0x0101 | FLAG "1" "BRAKE PRESSING" | 10 ms | 3 |

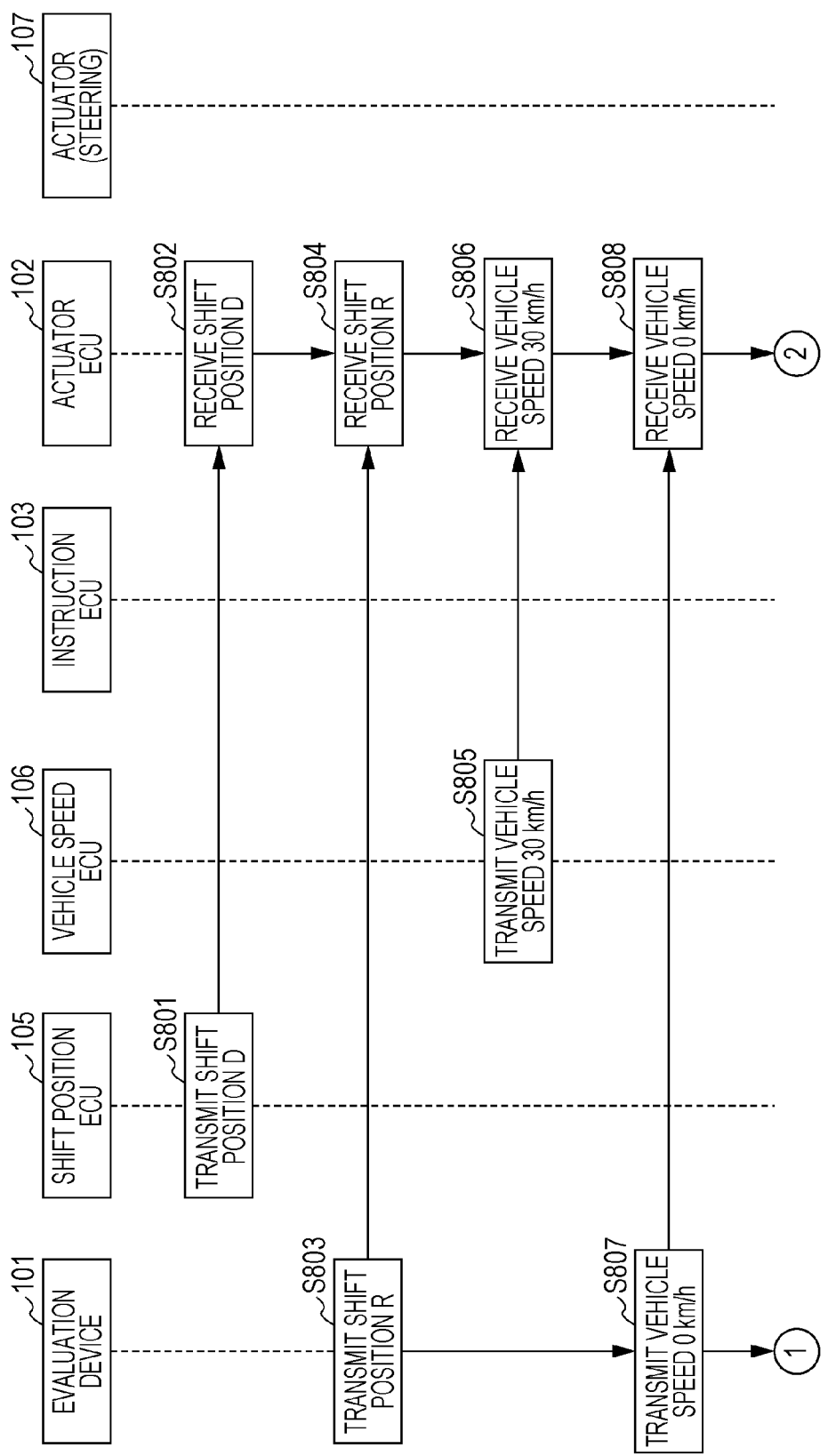

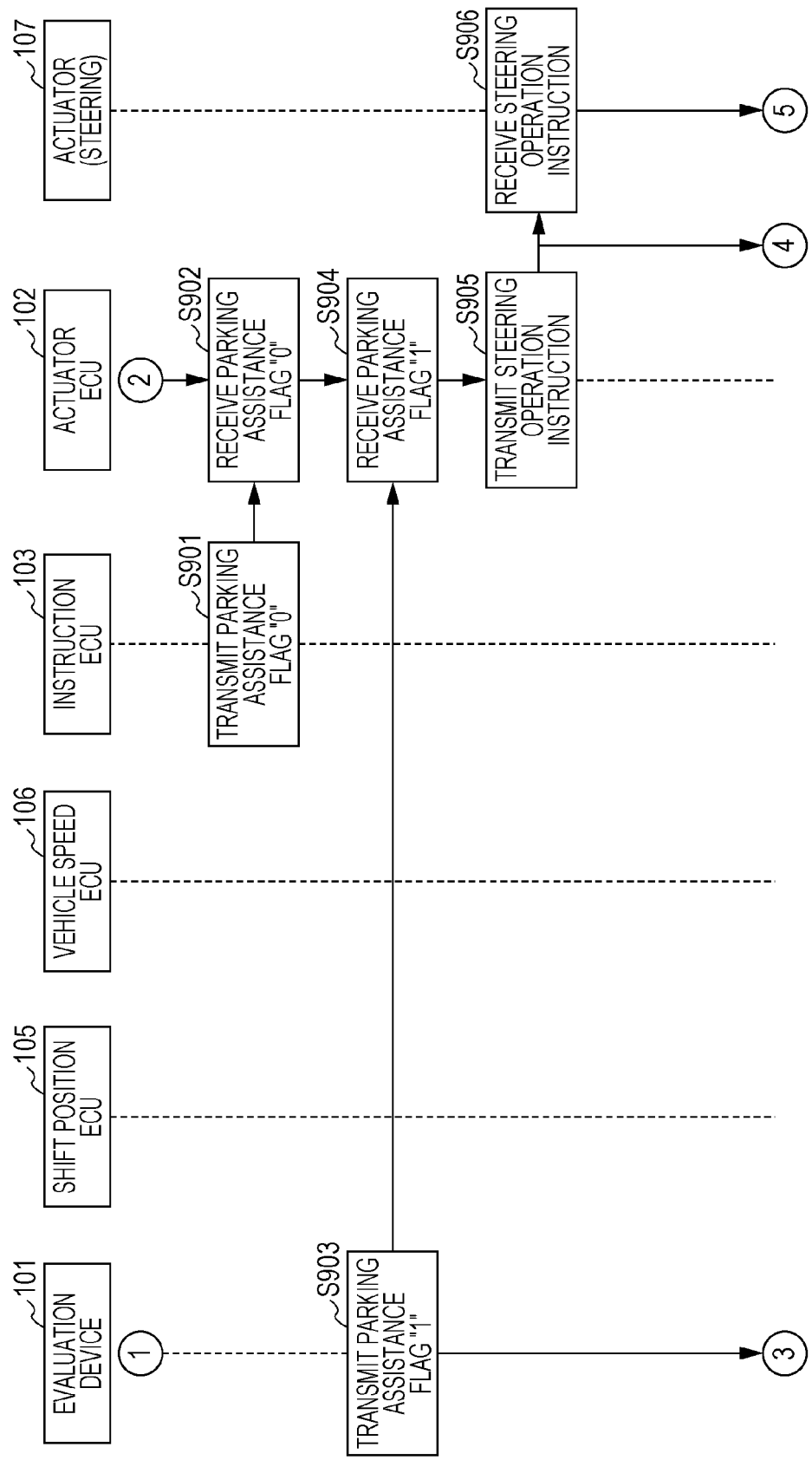

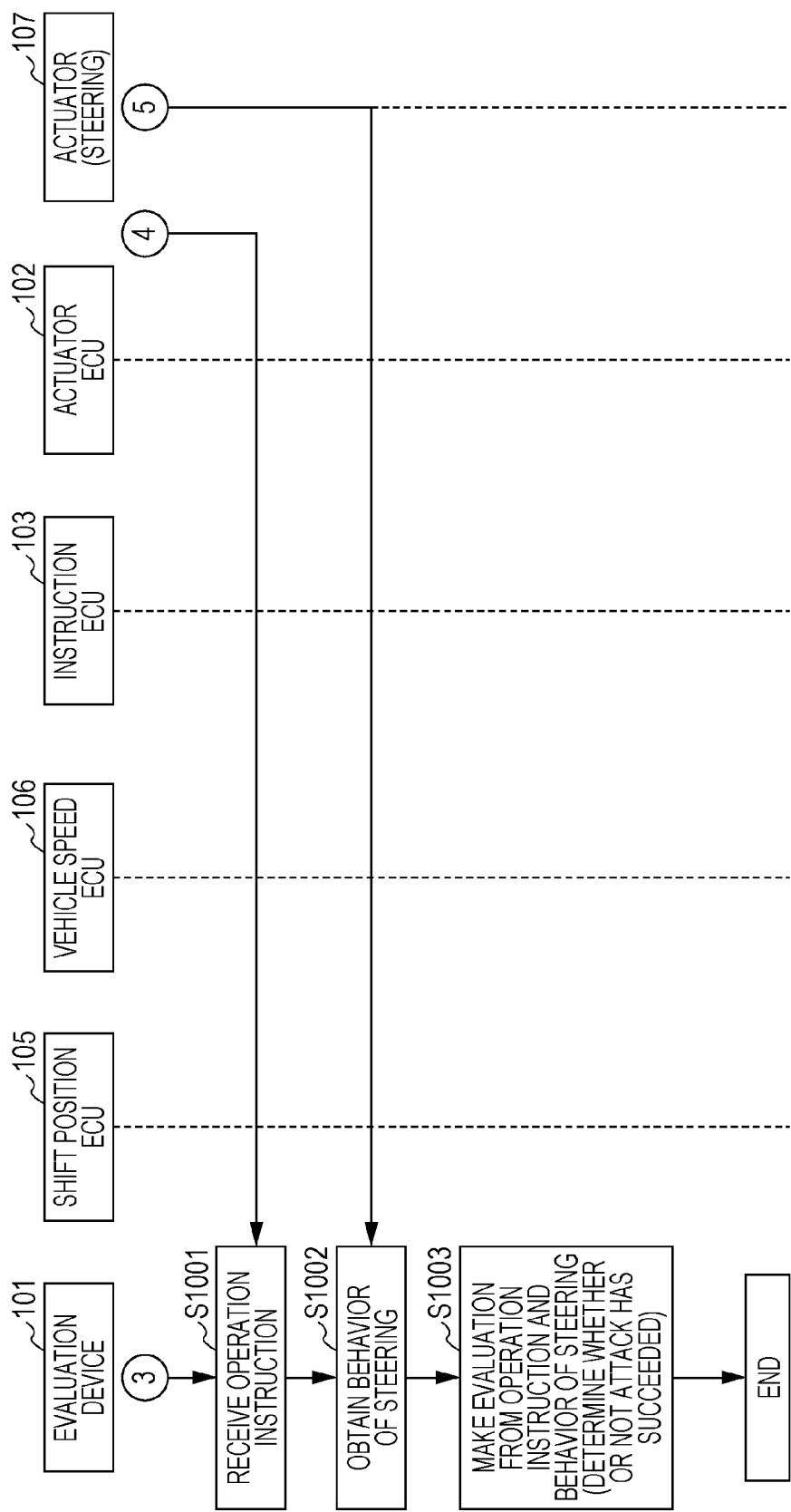

EVALUATION DEVICE, EVALUATION SYSTEM, AND EVALUATION METHOD

BACKGROUND

1. Technical Field

The present disclosure relates to a technique of evaluating security (e.g., attack resistance) of an electronic control system, such as an on-board network system, in which electronic control units perform communication.

2. Description of the Related Art

Recent automobiles are provided with a large number of electronic control units (ECUs), which are connected by an on-board network such as a controller area network (CAN) standard defined by ISO11898-1. As an attack on such an on-board network, it is known that an attacker wirelessly accesses an information terminal in a vehicle, transmits a CAN message to the on-board network from the information terminal by tampering with a program of the information terminal, and thereby controlling an actuator connected to an on-board ECU despite driver's intention. If a situation in which an on-board ECU itself has a function of wireless communication such as V2X (vehicle to vehicle communication (V2V) and vehicle to infrastructure communication (V2I) is realized, for example, for automated driving of automobiles, a program of the ECU that corresponds to V2X can be undesirably tampered with and used for an attack, as in the case of an information terminal. Although few studies have been conducted on a method for evaluating a measure against an attack, for example, Tsutomu MATSUMOTO, Yuki KOBAYASHI, Yuu TSUCHIYA, Naoki YOSHIDA, Nobuyoshi MORITA, Makoto KAYASHIMA "Syasai ECU Ni Taisuru CAN Keiyu No Fuzzing Syuhou (Fuzzing Method for On-board ECU over CAN)", SCIS2015, Jan. 20, 2015 (hereinafter referred to as Non Patent Literature 1) discloses fuzzing for finding out a problem (e.g., a bug introduced by erroneous programming) by transmitting data to a stand-alone on-board ECU and observing a response of the on-board ECU.

SUMMARY

In one general aspect, the techniques disclosed here feature an evaluation device for evaluating security of an electronic control system in which a plurality of electronic control units are connected to a bus used for communication, including: a recording medium that holds attack procedure information indicative of contents and a transmission order of a plurality of frames; a transmitter that transmits the plurality of frames to the bus in the transmission order indicated by the attack procedure information; a monitor that monitors an actuator unit controlled by any of the plurality of electronic control units; and an evaluator that makes the evaluation on basis of a monitoring result obtained by the monitor when the transmitter transmits the plurality of frames to the bus.

According to the present disclosure, it is possible to evaluate attack resistance of an electronic control system including a plurality of ECUs (e.g., whether or not a security technology applied to an electronic control system is capable of properly defending against an attack).

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating an example of attack procedure information held by a holding unit of the evaluation device;

FIG. 8 is a sequence diagram illustrating an operation example 1 of the evaluation system;

FIG. 9 is a sequence diagram illustrating the operation example 1 of the evaluation system;

FIG. 10 is a sequence diagram illustrating the operation example 1 of the evaluation system;

DETAILED DESCRIPTION

Figure 1:
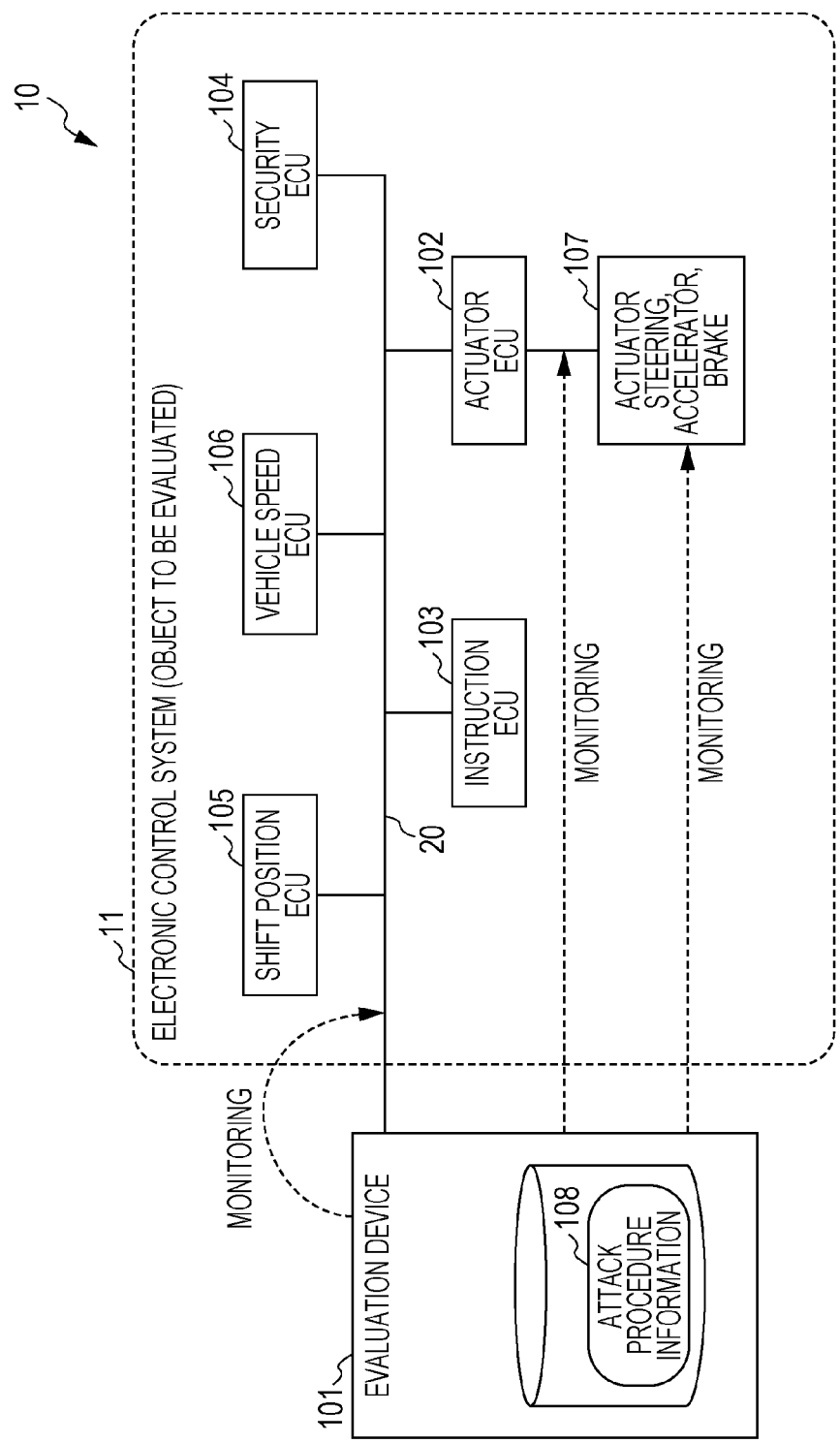
FIG. 1 is a diagram illustrating an outline configuration of an evaluation system according to Embodiment 1.

Underlying Knowledge Forming Basis of the Present Disclosure

The method disclosed in Non Patent Literature 1 can find out a problem of a stand-alone on-board ECU, but cannot evaluate security (e.g., attack resistance indicating whether or not a security technology applied to a target to be evaluated is capable of properly defending against an attack) of a system (electronic control system) including a plurality of ECUs that form an on-board network.

In view of this, the present disclosure provides an evaluation device that is capable of evaluating security of an electronic control system including a plurality of ECUs. Furthermore, the present disclosure provides an evaluation system and an evaluation method that are capable of evaluating security of an electronic control system including a plurality of ECUs.

An evaluation device according to an aspect of the present disclosure is an evaluation device for evaluating security of an electronic control system in which a plurality of electronic control units are connected to a bus used for communication, including: a recording medium that holds attack procedure information indicative of contents and a transmission order of a plurality of frames; a transmitter that transmits the plurality of frames to the bus in the transmission order indicated by the attack procedure information; a monitor that monitors an actuator unit controlled by any of the plurality of electronic control units; and an evaluator that makes the evaluation on basis of a monitoring result obtained by the monitor when the transmitter transmits the plurality of frames to the bus. The monitor can directly or indirectly monitor the actuator unit when the plurality of frames (e.g., CAN messages) are transmitted to the bus by the transmitter (e.g., immediately after the transmission or for a period from a time immediately before the transmission to a time immediately after the transmission). This makes it possible to evaluate a security function such as a defense function against an attack on driving of an actuator unit of an electronic control system to be evaluated that includes a plurality of electronic control units (ECUs).

The evaluation device may be, for example, configured such that the plurality of electronic control units perform communication over the bus in accordance with a controller area network (CAN) protocol. This makes it possible to evaluate, for example, attack resistance in a network according to the CAN for exchange of frames among the ECUs.

The evaluation device may be, for example, configured such that the monitor detects, as the monitoring of the actuator unit, transmission of a control instruction frame to the bus, the control instruction frame instructing one of the plurality of electronic control units to control the actuator unit; and the evaluator makes the evaluation so that an evaluation result differs depending on whether or not transmission of the control instruction frame over the bus has been detected by the monitor within a certain period after transmission of one or more of the plurality of frames from the transmitter to the bus. The control instruction frame can be identified, for example, by a frame ID defined in the electronic control system. This makes it possible to more properly evaluate the electronic control system by monitoring of the bus in a case where a frame for controlling the actuator unit is exchanged over the bus.

The evaluation device may be, for example, configured such that the monitor detects, as the monitoring of the actuator unit, input of a control signal to the actuator unit from one of the plurality of electronic control units; and the evaluator makes the evaluation so that an evaluation result differs depending on whether or not input of the control signal to the actuator unit has been detected by the monitor within a certain period after transmission of one or more of the plurality of frames from the transmitter to the bus. A control signal for controlling the actuator unit is defined in the electronic control system. This makes it possible to check whether or not a control signal has been transmitted to the actuator unit by an attack, thereby making it possible to make a proper evaluation.

The evaluation device may be, for example, configured such that the monitor, as the monitoring of the actuator unit, operation of the actuator unit; and the evaluator makes the evaluation so that an evaluation result differs depending on whether or not operation of the actuator unit has been detected by the monitor within a certain period after transmission of one or more of the plurality of frames from the transmitter to the bus. This makes it possible to check whether or not the actuator unit has operated by an attack, thereby making it possible to make a proper evaluation.

The evaluation device may be, for example, configured such that the actuator unit has an actuator; and the monitor detects operation of the actuator unit by measuring a physical amount changed by operation of the actuator. This makes it possible to check whether or not the actuator has actually operated by an attack, thereby making it possible to make a proper evaluation.

The evaluation device may be, for example, configured such that the actuator unit has a computer that executes a program simulating operation of an actuator; and the monitor detects operation of the actuator unit by observing a change of predetermined data concerning the program in the computer. This makes it possible to evaluate, for example, attack resistance in a case where a simulated actuator that replaces an actual actuator is used.

The evaluation device may be, for example, configured such that the attack procedure information further indicates a transmission interval between the plurality of frames; and the transmitter transmits the plurality of frames to the bus in accordance with the transmission order and the transmission interval indicated by the attack procedure information. This makes it possible to evaluate, for example, a defense function against an attack method defined by a transmission order and a transmission interval of a plurality of frames.

The evaluation device may be, for example, configured such that the evaluator outputs, as an evaluation result, information indicating whether or not the electronic control system has attack resistance. This allows a user of the evaluation device to know whether or not the electronic control system has attack resistance.

The evaluation device may be, for example, configured such that the transmitter repeats, plural times, an attack pattern of transmitting the plurality of frames to the bus in the transmission order indicated by the attack procedure information; and the evaluator makes the evaluation so that an evaluation result differs depending on whether or not the monitoring result has been changed by the repetition of the attack pattern. This makes it possible to evaluate, for example, attack resistance of the electronic control system against repetition of an attack pattern.

An evaluation system according to an aspect of the present disclosure is an evaluation system for evaluating security of an electronic control system including a plurality of electronic control units that perform communication over a bus, including: a recording medium that holds attack procedure information indicative of contents and a transmission order of a plurality of frames; a transmitter that transmits the plurality of frames to the bus in the transmission order indicated by the attack procedure information; a monitor that monitors an actuator unit controlled by any of the plurality of electronic control units; and an evaluator that makes the evaluation on basis of a monitoring result obtained by the monitor when the transmitter transmits the plurality of frames to the bus. This makes it possible to evaluate a security function such as a defense function against an attack on driving of an actuator unit of an electronic control system that includes a plurality of ECUs.

An evaluation method according to an aspect of the present disclosure for evaluating security of an electronic control system including a plurality of electronic control units that perform communication over a bus, including: holding attack procedure information indicative of contents and a transmission order of a plurality of frames; transmitting the plurality of frames to the bus in the transmission order indicated by the attack procedure information; monitoring an actuator unit controlled by any of the plurality of electronic control units when the plurality of frames are transmitted to the bus; and making the evaluation on basis of a monitoring result obtained by the monitoring. This makes it possible to evaluate a security function such as a defense function against an attack on driving of an actuator unit of an electronic control system to be evaluated that includes a plurality of ECUs.

The evaluation method may be, for example, arranged such that the plurality of electronic control units perform communication over the bus in accordance with controller area network (CAN) protocol; and the evaluation method further includes making the evaluation so that an evaluation result differs depending on whether or not transmission of a control instruction frame to the bus has been detected within a certain period after transmission of one or more of the plurality of frames to the bus, the control instruction frame instructing one of the plurality of electronic control units to control the actuator unit. This makes it possible to evaluate, for example, attack resistance of an electronic control system such as an on-board network system according to CAN.

It should be noted that these general or specific aspects may be implemented as a system, a method, an integrated circuit, a computer program, a computer-readable recording medium such as a CD-ROM, or any selective combination thereof.

An evaluation system according to an embodiment is described below with reference to the drawings. The embodiment illustrates a specific example of the present disclosure. Numerical values, constituent elements, the way in which the constituent elements are disposed and connected, steps, the order of steps, and the like in the embodiment below are examples and do not limit the present disclosure. Among the constituent elements in the embodiment below, constituent elements that are not described in independent claims are optional ones. Each of the drawings is a schematic view, and illustration thereof is not necessarily strict.

Embodiment 1

An evaluation device and an evaluation method for evaluating security of an on-board network system (electronic control system) that includes a plurality of electronic control units (ECUs) that are mounted on an automobile (vehicle) and perform communication over a bus, and an evaluation system including the electronic control system and the evaluation device are described below.

1.1 Configuration of Evaluation System 10

FIG. 1 is a diagram illustrating an outline configuration of an evaluation system 10. As illustrated in FIG. 1, the evaluation system 10 includes an evaluation device 101 and an electronic control system 11. The evaluation system 10 evaluates attack resistance (e.g., whether or not a security technology against an attack is properly working) of the electronic control system 11.

The electronic control system 11 is an on-board network system that includes an on-board network including a plurality of electronic control units (ECUs) that are connected to various devices such as a control device, a sensor, an actuator (e.g., steering, an accelerator, and a brake that can be electronically controlled), and a user interface device in a vehicle and that transmit and receive a frame over a bus (CAN bus) in the vehicle. In the electronic control system 11, functions such as a parking assistance function, a lane keeping assistance function, and a collision avoidance assistance function, which are functions of an advanced driver assistance system (ADAS), are realized by exchange of a frame and cooperation among the ECUs.

A vehicle may be provided with a large number of members such as sensors, actuators, and ECUs. For convenience of description, the following describes an example in which the electronic control system 11 includes an actuator ECU 102, an instruction ECU 103, a security ECU 104, a shift position ECU 105, a vehicle speed ECU 106, and an actuator 107 as illustrated in FIG. 1. The actuator 107 is a representative of steering, an accelerator, a brake, and the like, and the actuator ECU 102 is a representative of an ECU that controls one or more of the steering, accelerator, brake, and the like. The ECUs perform communication over a CAN bus 20 in accordance with a CAN standard (protocol). A data frame (also referred to as a CAN message), which is a frame used for transmission of data in the CAN, is defined so as to include an ID field in which ID (message ID) is stored, a data field in which data is stored, and the like.

The actuator ECU 102 is connected to the actuator 107 (e.g., steering, an accelerator, or a brake) via a signal line and is also connected to the CAN bus 20. The actuator ECU 102 controls the actuator 107 on the basis of a CAN message received over the CAN bus 20.

The instruction ECU 103 is connected to the CAN bus 20. The instruction ECU 103 obtains a CAN message indicative of a state or the like of the vehicle and transmits, to the actuator ECU 102 in the form of a CAN message, an instruction (e.g., a steering operating instruction) to control the actuator 107 under a certain condition.

The security ECU 104 always monitors the CAN bus 20 and takes an action such as an action of invalidating a CAN message, for example, upon detection of an unauthorized CAN message (CAN message for an attack). Any method can be used to invalidate a CAN message. For example, an unauthorized CAN message may be invalidated by transmitting an error frame defined by a CAN protocol so that the error frame overlaps the unauthorized CAN message.

The shift position ECU 105 and the vehicle speed ECU 106 obtain states of the vehicle in which the shift position ECU 105 and the vehicle speed ECU 106 are mounted and transmit the states to the CAN bus 20 in the form of a CAN message. The shift position ECU 105 transmits a CAN message indicative of a state (e.g., parking (P), reverse (R), or drive (D)) of a transmission gear that corresponds to a shift position of a shift lever of the vehicle, and the vehicle speed ECU 106 transmits a CAN message indicative of vehicle speed (speed of the vehicle).

The evaluation device 101 is a device that evaluates attack resistance of a security technology applied to the electronic control system 11 (object to be evaluated). The evaluation device 101 attacks (hacks) the object to be evaluated on the basis of attack procedure information 108 held therein, monitors the object to be evaluated in order to observe a response to the attack, and conduct an evaluation based on the monitoring result. An example of the evaluation conducted by the evaluation device 101 is determination of whether or not the object to be evaluated has resistance to the attack (whether or not the attack or defense has succeeded). Specifically, the evaluation device 101 monitors a frame (message) transmitted over the CAN bus 20, an input signal (i.e., an output signal of the actuator ECU 102) supplied to the actuator 107, and behavior (operation) of the actuator 107. The attack procedure information 108 indicates a procedure for an attack (the type, order, timing, frequency, and the like of a CAN message to be transmitted).

Constituent elements of the evaluation system 10 are described in detail below.

1.2 Configuration of Evaluation Device 101

Figure 2:
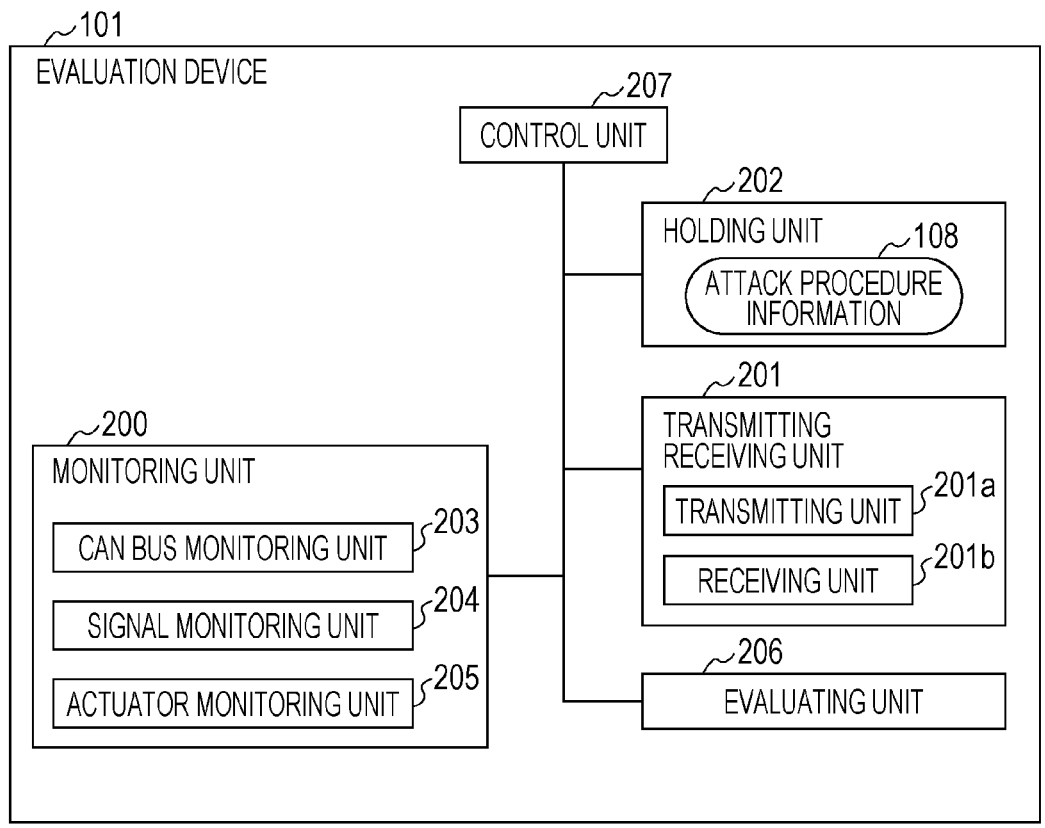
FIG. 2 is a diagram illustrating a configuration of an evaluation device in the evaluation system.

FIG. 2 is a diagram illustrating a configuration of the evaluation device 101 in the evaluation system 10.

As illustrated in FIG. 2, the evaluation device 101 includes a monitoring unit 200 (a CAN bus monitoring unit 203, a signal monitoring unit 204, and a actuator monitoring unit 205), a transmitting receiving unit 201 (a transmitting unit 201a and a receiving unit 201b), a holding unit 202, an evaluating unit 206, and a control unit 207.

The evaluation device 101 is, for example, a device including a processor (microprocessor), a digital circuit such as a memory, an analog circuit, a communication circuit, a hard disc, and the like. The memory is, for example, a ROM or a RAM and can store therein a control program (a computer program as software) executed by the processor. For example, the processor operates (e.g., controls various circuits) in accordance with the control program (computer program), and thereby the evaluation device 101 achieves various functions. The computer program is a combination of a plurality of command codes indicative of commands given to the processor in order to accomplish a predetermined function.

(1) Transmitting Receiving Unit 201

As the transmitting receiving unit 201, a communication circuit is, for example, used. The transmitting receiving unit 201 is constituted by the transmitting unit 201a and the receiving unit 201b. The transmitting unit 201a transmits a CAN message (e.g., a data frame indicative of a shift position, vehicle speed, or a steering operating instruction) to the CAN bus 20. The receiving unit 201b receives a CAN message (e.g., a data frame indicative of a steering operating instruction transmitted by the instruction ECU 103) transmitted over the CAN bus 20.

(2) Holding Unit 202

As the holding unit 202, a recording medium such as a memory or a hard disc is used. The holding unit 202 stores therein the attack procedure information 108 indicative of a procedure of an attack made by the evaluation device 101 in order to evaluate attack resistance and the like of an object to be evaluated. The attack procedure information 108 indicates, for example, a transmission order of a plurality of frames (CAN messages) for an attack. Details of the attack procedure information 108 will be described later with reference to FIG. 7.

(3) CAN Bus Monitoring Unit 203

As the CAN bus monitoring unit 203, a processor that executes a program is, for example, used. The CAN bus monitoring unit 203 monitors the CAN bus 20 to which the plurality of ECUs are connected in the electronic control system 11 to be evaluated. Specifically, the CAN bus monitoring unit 203 receives a CAN message via the receiving unit 201b and checks contents (payload) of data included in the CAN message. For example, the CAN bus monitoring unit 203 detects, as monitoring of the actuator 107, transmission, to the CAN bus 20, of a control instruction frame for instructing the instruction ECU 103 connected to the CAN bus 20 to control the actuator 107. Then, the CAN bus monitoring unit 203 checks, for example, contents of a data field (e.g., a valid/invalid flag of a parking assistance function, designation of a steering angle) of the control instruction frame (data frame concerning a steering operating instruction) transmitted by the instruction ECU 103.

(4) Signal Monitoring Unit 204

The signal monitoring unit 204 observes a signal (input signal supplied to the actuator 107) transmitted to the actuator 107 by the actuator ECU 102 via a signal line and checks contents of the signal. As the signal monitoring unit 204, a communication circuit that is connected to the actuator ECU 102, the actuator 107, or a signal line between the actuator ECU 102 and the actuator 107 or a processor that executes a program is, for example, used.

(5) Actuator Monitoring Unit 205

The actuator monitoring unit 205 observes the actuator 107 and checks behavior (operation) of the actuator 107. Specifically, the actuator monitoring unit 205 checks the amount of rotation in a case where the actuator 107 is steering and checks a state such as the amount of displacement or the presence or absence of a change in a case where the actuator 107 is an accelerator or a brake. As the actuator monitoring unit 205, a sensor that directly or indirectly measures a physical phenomenon caused by the actuator 107 (a physical amount changed by operation of the actuator 107) or a processor that executes a program is, for example, used.

(6) Evaluating Unit 206

As the evaluating unit 206, a processor that executes a program is, for example, used. The evaluating unit 206 evaluates security of the electronic control system 11 on the basis of a result of monitoring by the monitoring unit 200 (the CAN bus monitoring unit 203, the signal monitoring unit 204, and the actuator monitoring unit 205). Specifically, the evaluating unit 206 determines, for example, whether or not an attack has succeeded (e.g., whether or not a defense function against the attack has properly worked) by comparing all of or part of the result of monitoring by the monitoring unit 200 and a value expected from transmission of a CAN message based on the attack procedure information 108. The expected value is, for example, behavior of the actuator expected as a result of the attack, a control signal that is expected to be supplied to the actuator 107 as a result of the attack, or a CAN message (e.g., control instruction frame) that is expected to be transmitted by the instruction ECU 103 as a result of the attack and may be defined in advance. The evaluating unit 206 makes an evaluation on the basis of a result of monitoring that is performed by the monitoring unit 200 at the time of transmission (e.g., for a certain period after transmission or for a period from a time immediately before transmission to a time immediately after transmission) of a CAN message for an attack based on the attack procedure information 108 to the CAN bus 20 from the transmitting unit 201a. The evaluating unit 206 may, for example, determine whether or not the CAN bus monitoring unit 203 has detected transmission of a control instruction frame over the CAN bus 20 within a certain period after one or more of a plurality of frames (CAN messages) for an attack indicated by the attack procedure information 108 is transmitted to the CAN bus 20 by the transmitting unit 201a and then make an evaluation so that a result of the evaluation differs depending on whether the control instruction frame has been detected or not. Alternatively, the evaluating unit 206 may, for example, determine whether or not the signal monitoring unit 204 has detected input of a control signal for control to the actuator 107 within a certain period after transmission of one or more of the CAN messages for an attack to the CAN bus 20 and make an evaluation so that a result of the evaluation differs depending on whether the control signal has been detected or not. Alternatively, the evaluating unit 206 may, for example, determine whether or not the actuator monitoring unit 205 has detected operation of the actuator 107 within a certain period after transmission of one or more of the CAN messages for an attack to the CAN bus 20 and make an evaluation so that a result of the evaluation differs depending on whether the operation of the actuator 107 has been detected or not.

(7) Control Unit 207

As the control unit 207, a processor that executes a program is, for example, used. The control unit 207 manages and controls the monitoring unit 200, the transmitting receiving unit 201, the holding unit 202, and the evaluating unit 206 and thus achieves functions of the evaluation device 101.

1.3 Configuration of Actuator ECU 102

Figure 3:
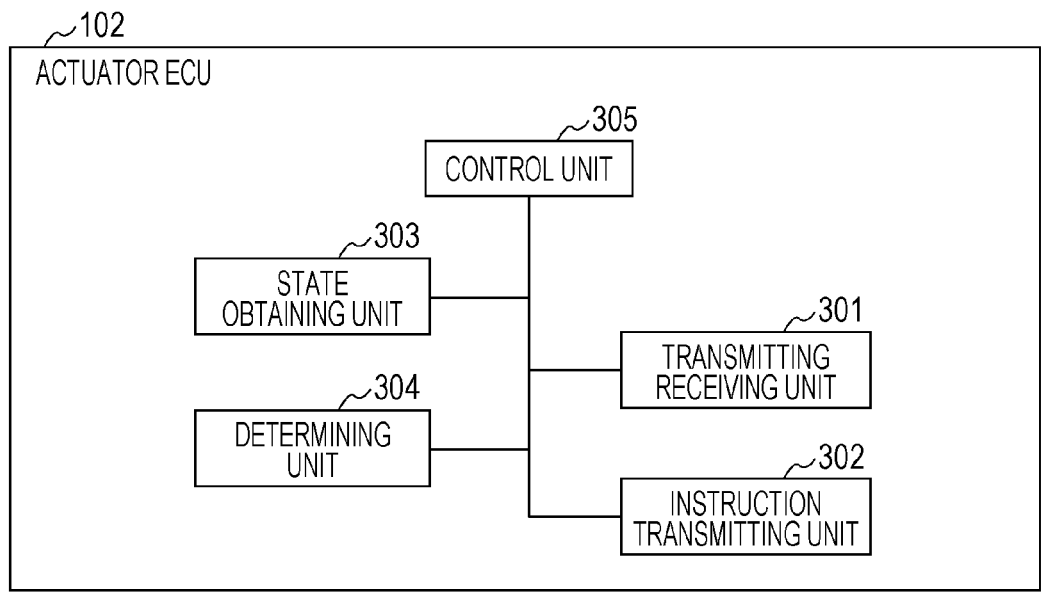
FIG. 3 is a diagram illustrating a configuration of an actuator ECU in an electronic control system to be evaluated.

FIG. 3 is a diagram illustrating a configuration of the actuator ECU 102.

As illustrated in FIG. 3, the actuator ECU 102 includes a transmitting receiving unit 301, an instruction transmitting unit 302, a state obtaining unit 303, a determining unit 304, and a control unit 305.

The actuator ECU 102 is an ECU connected to the CAN bus 20. The ECU is, for example, a device including a processor, a digital circuit such as a memory, an analog circuit, a communication circuit, and the like. The memory is, for example, a ROM or a RAM and can store therein a control program (a computer program as software) executed by the processor. For example, the processor operates (e.g., controls various circuits) in accordance with the control program (computer program), and thereby the actuator ECU 102 achieves functions thereof.

(1) Transmitting Receiving Unit 301

The transmitting receiving unit 301 transmits a CAN message to the CAN bus 20 and receives a CAN message transmitted over the CAN bus 20. The transmitting receiving unit 301 receives, for example, a CAN message indicative of a shift position, vehicle speed, or a steering operating instruction.

(2) Instruction Transmitting Unit 302

The instruction transmitting unit 302 transmits a control signal to the actuator 107 via a signal line on the basis of a CAN message received via the transmitting receiving unit 301. The control signal is, for example, a signal (steering operation instruction) for instructing steering to rotate, for example, by indicating a rotation angle or the like or a signal for instructing an accelerator or a brake to operate, for example, by indicating the amount of displacement (e.g., the amount of pressing) or the like.

(3) State Obtaining Unit 303

The state obtaining unit 303 obtains a state of the actuator 107 via a signal line connected to the actuator 107. The state obtained by the state obtaining unit 303 is, for example, a rotation angle in a case where the actuator 107 is steering and is the amount of displacement (e.g., the amount of pressing) in a case where the actuator 107 is an accelerator or a brake.

(4) Determining Unit 304

The determining unit 304 determines whether or not to transmit a control signal to the actuator 107 on the basis of a CAN message received via the transmitting receiving unit 301. For example, in a case where a control signal for instructing steering as the actuator 107 is transmitted, the determining unit 304 determines whether or not to transmit the control signal and determines the amount of control (e.g., rotation angle) specified by the control signal on the basis of information such as a shift position, vehicle speed, or a steering operating instruction received via the transmitting receiving unit 301.

(5) Control Unit 305

The control unit 305 manages and controls the transmitting receiving unit 301, the instruction transmitting unit 302, the state obtaining unit 303, and the determining unit 304 and thereby achieves the functions of the actuator ECU 102.

1.4 Configuration of Instruction ECU 103

Figure 4:
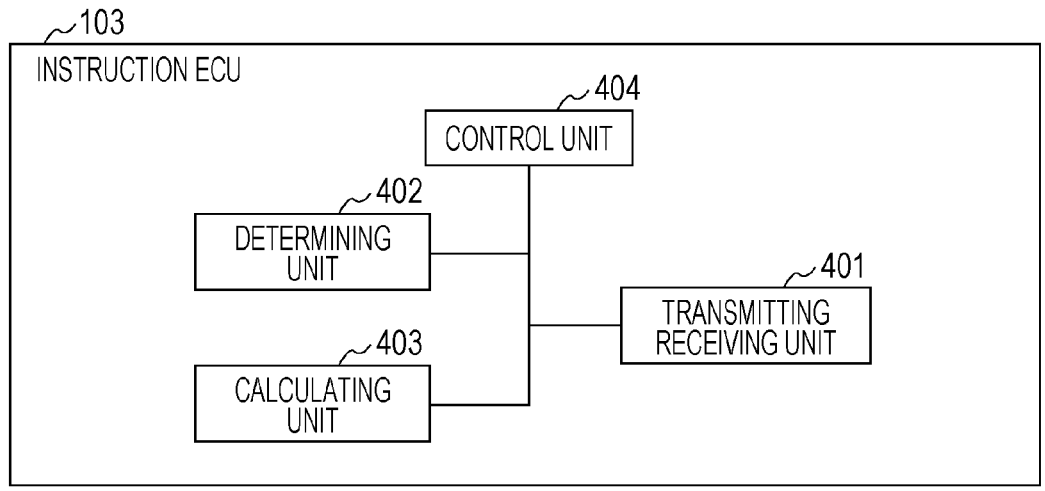
FIG. 4 is a diagram illustrating a configuration of an instruction ECU in the electronic control system to be evaluated.

FIG. 4 is a diagram illustrating a configuration of the instruction ECU 103.

As illustrated in FIG. 4, the instruction ECU 103 includes a transmitting receiving unit 401, a determining unit 402, a calculating unit 403, and a control unit 404.

The instruction ECU 103 is an ECU connected to the CAN bus 20. A processor of the instruction ECU 103 operates in accordance with a control program (computer program) stored in a memory, and thereby the instruction ECU 103 accomplishes the functions thereof.

(1) Transmitting Receiving Unit 401

The transmitting receiving unit 401 transmits a CAN message to the CAN bus 20 and receives a CAN message transmitted over the CAN bus 20. For example, the transmitting receiving unit 401 transmits a CAN message indicative of a steering operating instruction and receives a CAN message indicative of a shift position or vehicle speed.

(2) Determining Unit 402

The determining unit 402 determines whether or not to give a control instruction (e.g., a CAN message that is a control instruction frame indicative of a steering operating instruction) to the actuator ECU 102 on the basis of a CAN message received via the transmitting receiving unit 401. For example, in a case where a control instruction is given to the actuator ECU 102 in order to control steering, the determining unit 402 determines whether or not to give the control instruction, for example, on the basis of information concerning a shift position, vehicle speed, or start of a parking assistance function indicated by a CAN message received via the transmitting receiving unit 401. In the present embodiment, it is assumed that the CAN message indicative of information concerning start of the parking assistance function in the electronic control system 11 is transmitted, for example, from an ECU (not illustrated) that is connected to the CAN bus 20 and has a user interface. This ECU may transmit a CAN message indicative of information concerning start of the parking assistance function, for example, in accordance with an operation of a driver of the vehicle.

(3) Calculating Unit 403

The calculating unit 403 calculates the amount of control (e.g., a rotation angle of steering) specified by a control instruction on the basis of a CAN message received via the transmitting receiving unit 401.

(4) Control Unit 404

The control unit 404 manages and controls the transmitting receiving unit 401, the determining unit 402, and the calculating unit 403 and thereby achieves functions of the instruction ECU 103.

1.5 Configuration of Security ECU 104

Figure 5:
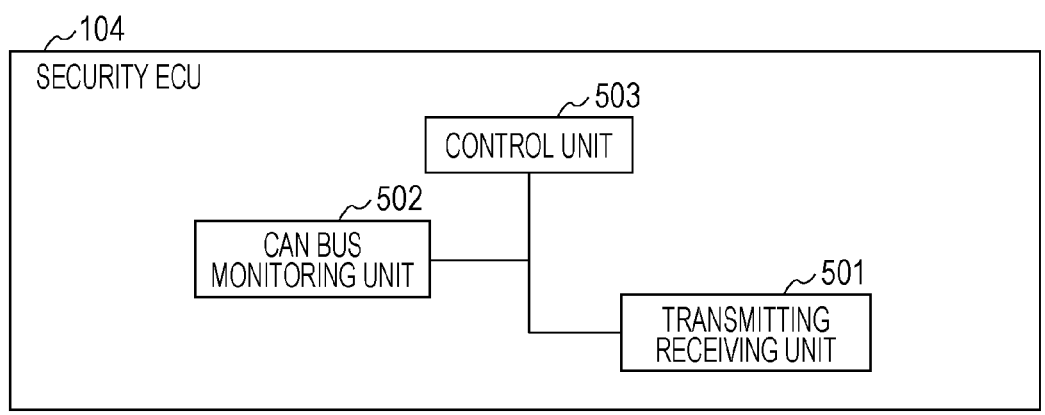
FIG. 5 is a diagram illustrating a configuration of a security ECU in the electronic control system to be evaluated.

FIG. 5 is a diagram illustrating a configuration of the security ECU 104.

As illustrated in FIG. 5, the security ECU 104 includes a transmitting receiving unit 501, a CAN bus monitoring unit 502, and a control unit 503.

The security ECU 104 is an ECU that is connected to the CAN bus 20 and has a security function (e.g., defense function) against an attack. A processor of the security ECU 104 operates in accordance with a control program (computer program) stored in a memory, and thereby the security ECU 104 accomplishes functions thereof.

(1) Transmitting Receiving Unit 501

The transmitting receiving unit 501 receives a CAN message transmitted over the CAN bus 20 and transmits an error signal to the CAN bus 20 upon instruction from the CAN bus monitoring unit 502 in order to invalidate an unauthorized CAN message. The transmitting receiving unit 501 receives, for example, a CAN message indicative of a shift position, vehicle speed, or a steering operating instruction.

(2) CAN Bus Monitoring Unit 502

The CAN bus monitoring unit 502 checks contents (payload) of data included in a CAN message received via the transmitting receiving unit 501 from the CAN bus 20 to which the plurality of ECUs are connected. The CAN bus monitoring unit 502 transmits an error frame via the transmitting receiving unit 501 in a case where the CAN bus monitoring unit 502 confirms transmission of an unauthorized CAN message (i.e., a CAN message that is not compliant with a rule predetermined in the electronic control system 11).

(3) Control Unit 503

The control unit 503 manages and controls the transmitting receiving unit 501 and the CAN bus monitoring unit 502 and thereby achieves functions of the security ECU 104.

1.6 Configurations of Shift Position ECU 105 and Vehicle Speed ECU 106

Figure 6:
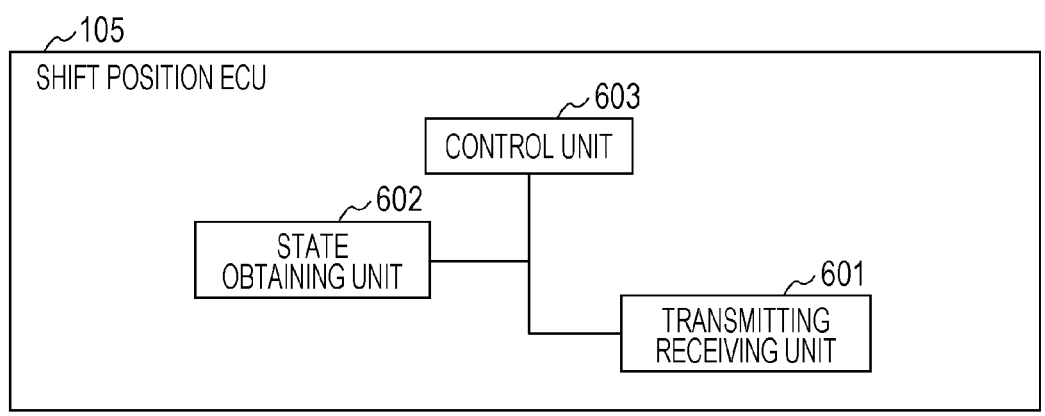
FIG. 6 is a diagram illustrating a configuration of a shift position ECU in the electronic control system to be evaluated.

FIG. 6 is a diagram illustrating a configuration of the shift position ECU 105.

As illustrated in FIG. 6, the shift position ECU 105 includes a transmitting receiving unit 601, a state obtaining unit 602, and a control unit 603. The vehicle speed ECU 106 has a similar configuration to the shift position ECU 105.

The shift position ECU 105 and the vehicle speed ECU 106 are each an ECU connected to the CAN bus 20. A processor of each of these ECU operates in accordance with a control program (computer program) stored in a memory, and thereby the ECU accomplishes functions thereof.

(1) Transmitting Receiving Unit 601

The transmitting receiving unit 601 transmits a CAN message to the CAN bus 20 and receives a CAN message transmitted over the CAN bus 20.

(2) State Obtaining Unit 602

The state obtaining unit 602 obtains a state of the vehicle from a sensor or the like and transmits a CAN message indicative of the obtained state via the transmitting receiving unit 601. The state obtaining unit 602 of the shift position ECU 105 obtains a shift position, and the state obtaining unit 602 of the vehicle speed ECU 106 obtains vehicle speed.

(3) Control Unit 603

The control unit 603 manages and controls the transmitting receiving unit 601 and the state obtaining unit 602 and achieves functions of the shift position ECU 105 or the vehicle speed ECU 106.

1.7 Attack Procedure Information

FIG. 7 illustrates an example of the attack procedure information 108 held by the holding unit 202 of the evaluation device 101. In the example of FIG. 7, the attack procedure information 108 indicates a function to be evaluated (a function of the electronic control system 11 to be attacked), a CAN message transmitted for an attack, a message ID of the CAN message, data contents of the CAN message (i.e., contents of a notification or an instruction given to another ECU), a transmission interval of the CAN message, and a transmission order.

The attack procedure information 108 in the example of FIG. 7 indicates, in a case where the parking assistance function is to be attacked, that a notification indicating that the shift position is "reverse" is given by a CAN message indicative of a shift position and having an ID (message ID) of 0x0123, a notification indicating that the vehicle speed is "6 km/h" is then given by a CAN message indicative of vehicle speed and having an ID of 0x0034, and a flag "1" for rotating steering rightward by 15 degrees and data specifying "rightward rotation by 15 degrees" as a steering angle are finally transmitted by a CAN message indicative of a steering operating instruction and having an ID of 0x0256. This flag is a valid/invalid flag indicating whether the parking assistance function is valid or invalid, and indicates that the parking assistance function is valid in a case where the flag is "1" and indicates that the parking assistance function is not valid (invalid) in a case where the flag is "0". The example of FIG. 7 is merely an example, and the contents of the attack procedure information 108 may be any ones. The transmitting unit 201a transmits a plurality of CAN messages to the CAN bus 20 in the transmission order indicated by the attack procedure information 108. The attack procedure information 108 may define a transmission interval between the plurality of CAN messages. In this case, the transmitting unit 201a transmit the plurality of CAN messages to the CAN bus 20 in accordance with the transmission order and the transmission interval indicated by the attack procedure information 108.

In the electronic control system 11, a CAN message concerning a shift position, vehicle speed, or a steering operating instruction (a valid/invalid state of the parking assistance function) is periodically transmitted over the CAN bus 20. In a case where there is no need to operate steering (in a case where the parking assistance function is not working), a CAN message concerning a steering operating instruction (a valid/invalid state of the parking assistance function) is periodically transmitted in a state where the flag is "0", whereas in a case where there is need to operate the steering, the CAN message (i.e., CAN message indicative of a steering operating instruction) is periodically transmitted in a state where the flag has been changed to "1".

1.8 Operation of Evaluation System 10

Operation of the evaluation system 10 configured as above is described below in which the evaluation device 101 evaluates the electronic control system 11 to be evaluated by attacking (transmitting a CAN message) the electronic control system 11 in accordance with the attack procedure information 108. First, an operation example 1 and an operation example 2 in which the electronic control system 11 from which the security ECU 104 is removed (e.g., before the security ECU 104 is introduced) is evaluated as an object to be evaluated are described, and then an operation example 3 and an operation example 4 in which the electronic control system 11 having the security ECU 104 (e.g., after the security ECU 104 has been introduced) is evaluated as an object to be evaluated are described.

1.8.1 Operation Example 1 of Evaluation System 10

FIGS. 8 through 10 are sequence diagrams each illustrating operation (the operation example 1) of the evaluation system 10 for evaluating the electronic control system 11 in which the security ECU 104 is not provided. The sequence diagram illustrated in FIG. 8 continues to the sequence diagram illustrated in FIG. 9. The sequence diagram illustrated in FIG. 9 continues to the sequence diagram illustrated in FIG. 10. In the operation example 1, the evaluation device 101 makes the actuator ECU 102 have false recognition of an attack. In the electronic control system 11, CAN messages concerning a shift position, vehicle speed, and a steering operating instruction are periodically transmitted by the shift position ECU 105, the vehicle speed ECU 106, and the instruction ECU 103, respectively.

The shift position ECU 105 transmits a CAN message indicative of a current shift position (drive (D)) to the CAN bus 20 (Step S801), and the actuator ECU 102 receives the CAN message indicative of the shift position transmitted over the CAN bus 20 (Step S802).

The evaluation device 101 transmits, to the CAN bus 20, a CAN message indicative of a false shift position (reverse (R)) for disguising the current shift position in accordance with the attack procedure information 108 immediately after transmission of the CAN message indicative of the shift position (drive (D)) to the CAN bus 20, for example, in order to overwrite a buffer for regular processing of a CAN message in the actuator ECU 102 (Step S803). As a result, the actuator ECU 102 receives the CAN message indicative of the shift position transmitted over the CAN bus 20 and falsely recognizes the current shift position as reverse (R) (Step S804).

The vehicle speed ECU 106 transmits a CAN message indicative of a current vehicle speed (30 km/h) to the CAN bus 20 (Step S805), and the actuator ECU 102 receives the CAN message indicative of the vehicle speed transmitted over the CAN bus 20 (Step S806).

The evaluation device 101 transmits, to the CAN bus 20, a CAN message indicative of a false vehicle speed (0 km/h) that disguises the current vehicle speed immediately after transmission of the CAN message indicative of the vehicle speed (30 km/h) to the CAN bus 20 (Step S807). As a result, the actuator ECU 102 receives the CAN message indicative of the vehicle speed transmitted over the CAN bus 20 and falsely recognizes the current vehicle speed as 0 km/h (Step S808).

The instruction ECU 103 transmits, to the CAN bus 20, a CAN message indicating that the parking assistance function is currently invalid (flag: 0) (Step S901), and the actuator ECU 102 receives the CAN message concerning a valid/invalid state of the parking assistance function transmitted over the CAN bus 20 (Step S902).

The evaluation device 101 transmits, to the CAN bus 20, a CAN message indicating that the parking assistance function is currently valid (flag: 1) immediately after transmission of the CAN message indicating that the parking assistance function is currently invalid (flag: 0) to the CAN bus 20 (Step S903). As a result, the actuator ECU 102 receives the CAN message concerning a valid/invalid state of the parking assistance function transmitted over the CAN bus 20, falsely recognizes that the parking assistance function is currently valid (Step S904), and transmits a control signal (steering operation instruction) for operating the steering on the basis of designation of a steering angle included in the CAN message concerning a valid/invalid state of the parking assistance function (i.e., CAN message indicative of a steering operating instruction because the parking assistance function is valid) (Step S905). The steering as the actuator 107 operates on the basis of the received control signal (steering operation instruction) (Step S906). Hereinafter, the steering as the actuator 107 is referred to as the actuator 107 (steering).

The evaluation device 101 receives (monitors) the control signal (steering operation instruction) transmitted to the actuator 107 (steering) by the actuator ECU 102 (Step S1001). Furthermore, the evaluation device 101 checks (observes) behavior of the actuator 107 (steering) (Step S1002). The evaluation device 101 evaluates security of the electronic control system 11 (e.g., whether or not the attack has succeeded) by comparing the received control signal and the checked behavior of the actuator 107 (steering) with a value expected as a result of the attack (Step S1003). The evaluation device 101 determines that the attack has succeeded, for example, in a case where the received control signal and the checked behavior of the actuator 107 (steering) are ones expected as a result of the attack. The evaluation device 101 may determine, for example, whether or not the attack has succeeded on the basis of the value expected as a result of the attack by using only one of a result of monitoring of the control signal supplied to the actuator 107 (steering) and a result of checking of the behavior of the actuator 107 (steering).

The evaluation device 101 can evaluate, for example, an effect of a security technology (e.g., the security ECU 104) to be introduced later in the electronic control system 11 by confirming that the attack based on the attack procedure information 108 has succeeded.

1.8.2 Operation Example 2 of Evaluation System 10

Figure 11:
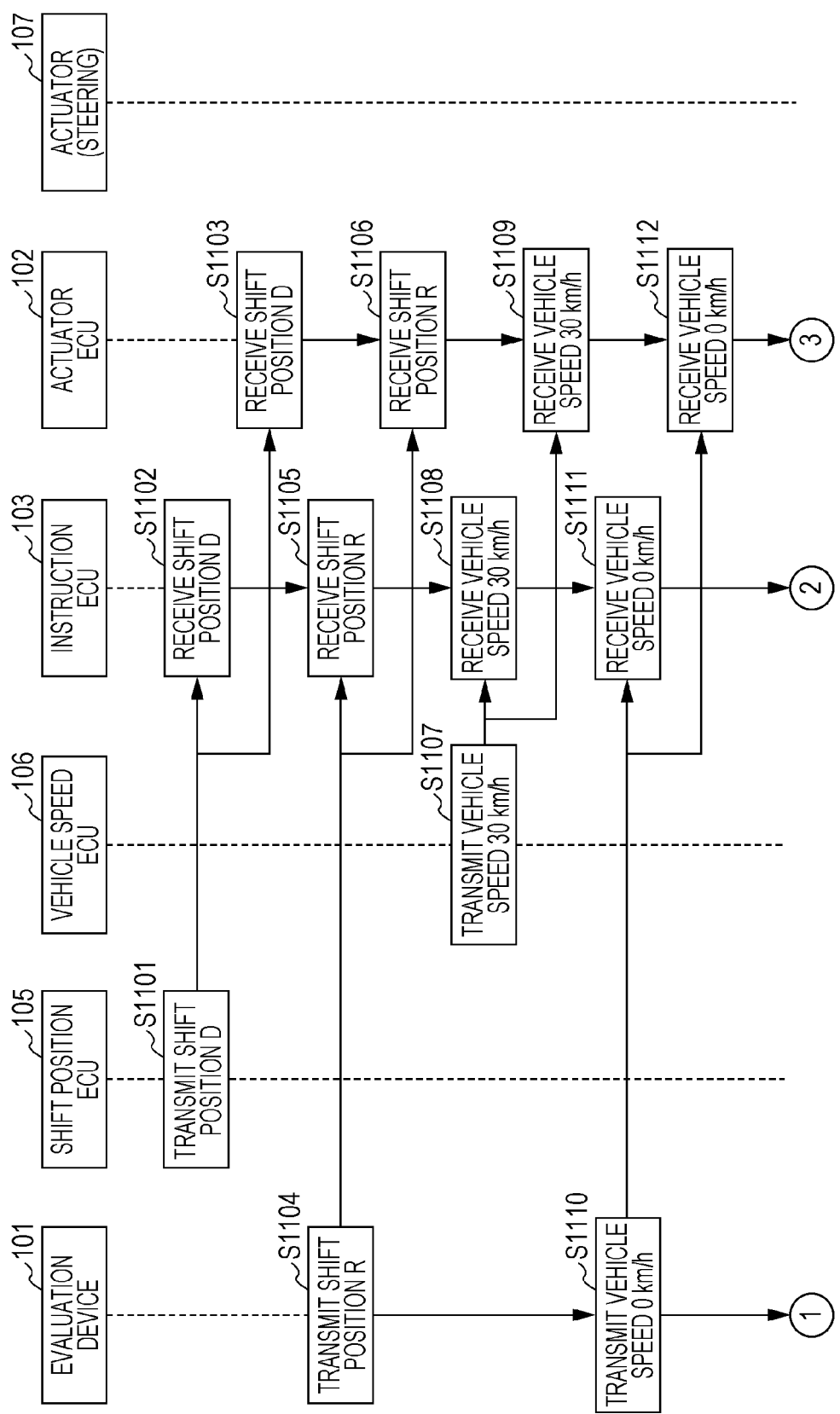
FIG. 11 is a sequence diagram illustrating an operation example 2 of the evaluation system.
Figure 12:
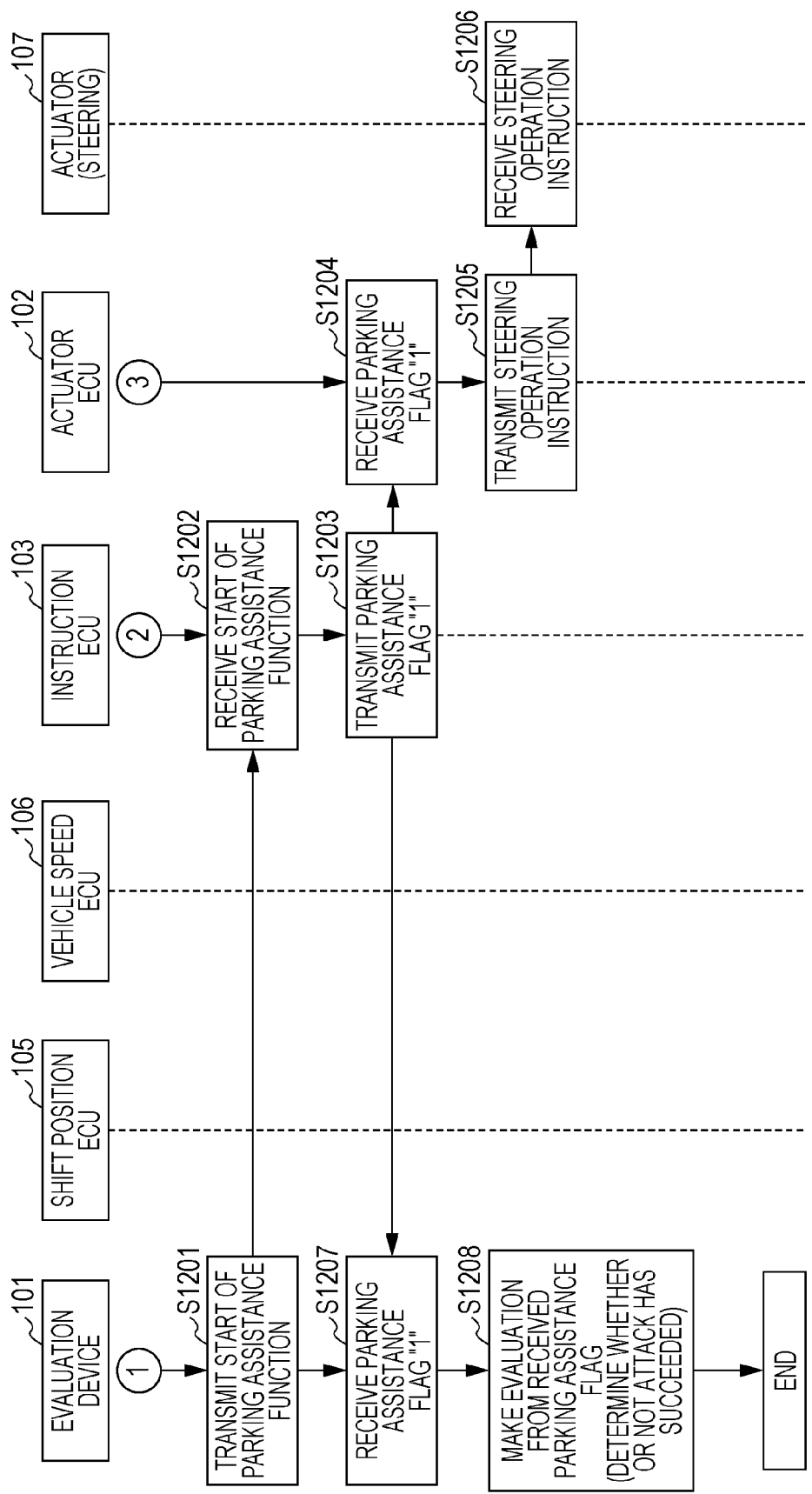
FIG. 12 is a sequence diagram illustrating the operation example 2 of the evaluation system.

FIGS. 11 and 12 are sequence diagrams each illustrating operation (the operation example 2) of the evaluation system 10 for evaluating the electronic control system 11 in which the security ECU 104 is not provided. The sequence diagram illustrated in FIG. 11 continues to the sequence diagram illustrated in FIG. 12. In the operation example 2, the evaluation device 101 makes the instruction ECU 103 have false recognition by an attack.

The shift position ECU 105 transmits, to the CAN bus 20, a CAN message indicative of a current shift position (drive (D)) (Step S1101), and the instruction ECU 103 receives the CAN message indicative of the shift position transmitted over the CAN bus 20 (Step S1102). The actuator ECU 102 also receives the CAN message indicative of the shift position transmitted over the CAN bus 20 (Step S1103).

The evaluation device 101 transmits, to the CAN bus 20, a CAN message indicative of a false shift position (reverse (R)) that disguises the current shift position in accordance with the attack procedure information 108 immediately after transmission of the CAN message indicative of the shift position (drive (D)) to the CAN bus 20 (Step S1104). As a result, the instruction ECU 103 receives the CAN message indicative of the shift position transmitted over the CAN bus 20 and falsely recognizes that the current shift position is reverse (R) (Step S1105). The actuator ECU 102 also receives the CAN message indicative of the shift position transmitted over the CAN bus 20 and falsely recognizes that the current shift position is reverse (R) (Step S1106).

The vehicle speed ECU 106 transmits a CAN message indicative of a current vehicle speed (30 km/h) to the CAN bus 20 (Step S1107), and the instruction ECU 103 receives the CAN message indicative of the vehicle speed transmitted over the CAN bus 20 (Step S1108). The actuator ECU 102 also receives the CAN message indicative of the vehicle speed transmitted over the CAN bus 20 (Step S1109).

The evaluation device 101 transmits, to the CAN bus 20, a CAN message indicative of a false vehicle speed (0 km/h) that disguises the current vehicle speed immediately after transmission of the CAN message indicative of the vehicle speed (30 km/h) to the CAN bus 20 (Step S1110). As a result, the instruction ECU 103 receives the CAN message indicative of the vehicle speed transmitted over the CAN bus 20 and falsely recognizes that the current vehicle speed is 0 km/h (Step S1111). The actuator ECU 102 also receives the CAN message indicative of the vehicle speed transmitted over the CAN bus 20 and falsely recognizes that the current vehicle speed is 0 km/h (Step S1112).

The evaluation device 101 transmits a CAN message indicative of start of the parking assistance function to the CAN bus 20 (Step S1201), and the instruction ECU 103 receives the CAN message concerning start of the parking assistance function (the CAN message indicative of start of the parking assistance function) transmitted over the CAN bus 20 (Step S1202).

Then, the instruction ECU 103 transmits, to the CAN bus 20, a CAN message (i.e., a CAN message indicative of a steering operating instruction) indicating that the parking assistance function is valid (flag: 1) (Step S1203) because the shift position and the vehicle speed that have been received satisfy a certain condition for execution of the parking assistance function. As a result, the actuator ECU 102 receives the CAN message concerning a valid/invalid state of the parking assistance function transmitted over the CAN bus, falsely recognizes that the parking assistance function is currently valid (Step S1204), and transmits a control signal (steering operation instruction) to the actuator 107 (steering) on the basis of designation of a steering angle included in the CAN message concerning a valid/invalid state of the parking assistance function (the CAN message indicative of a steering operating instruction) (Step S1205). Then, the actuator 107 (steering) operates on the basis of the received control signal (steering operation instruction) (Step S1206).

The evaluation device 101 receives (monitors) the CAN message (flag: 1) concerning a valid/invalid state of the parking assistance function transmitted to the CAN bus by the instruction ECU 103 (Step S1207). The evaluation device 101 evaluates security of the electronic control system 11 (e.g., whether or not the attack has succeeded) by comparing the contents of the received CAN message concerning a valid/invalid state of the parking assistance function with a value expected as a result of the attack (Step S1208). The evaluation device 101 determines that a control instruction frame for controlling the actuator 107 (steering) has been detected and thus determines that the attack has succeeded, for example, in a case where the flag of the received CAN message concerning a valid/invalid state of the parking assistance function is a flag value (1), which is a value expected as a result of the attack.

The evaluation device 101 can evaluate, for example, an effect of a security technology (e.g., the security ECU 104) introduced into the electronic control system 11 later by confirming that the attack based on the attack procedure information 108 has succeeded.

1.8.3 Operation Example 3 of Evaluation System 10

Figure 13:
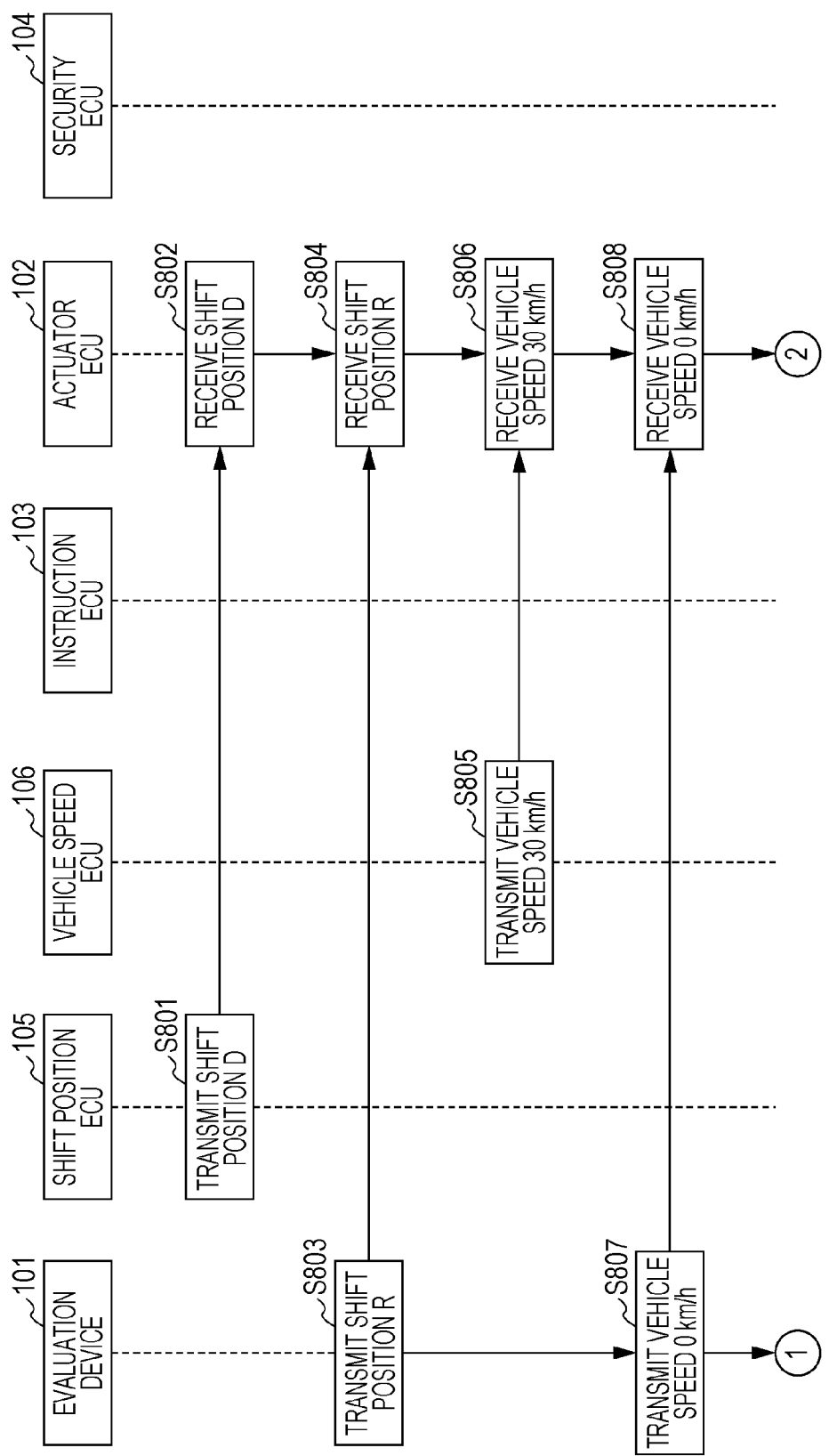
FIG. 13 is a sequence diagram illustrating an operation example 3 of the evaluation system.
Figure 14:
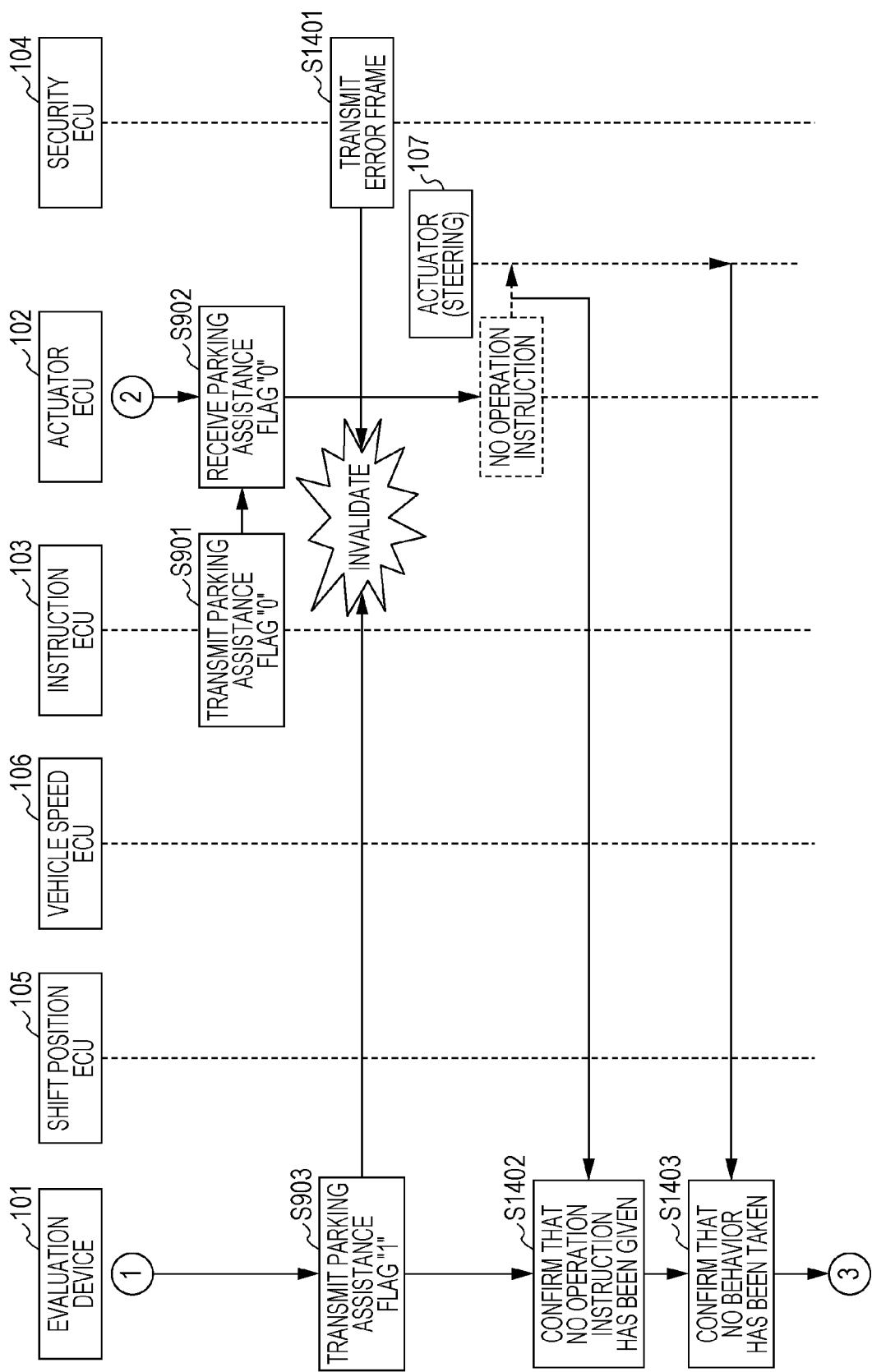
FIG. 14 is a sequence diagram illustrating the operation example 3 of the evaluation system.
Figure 15:
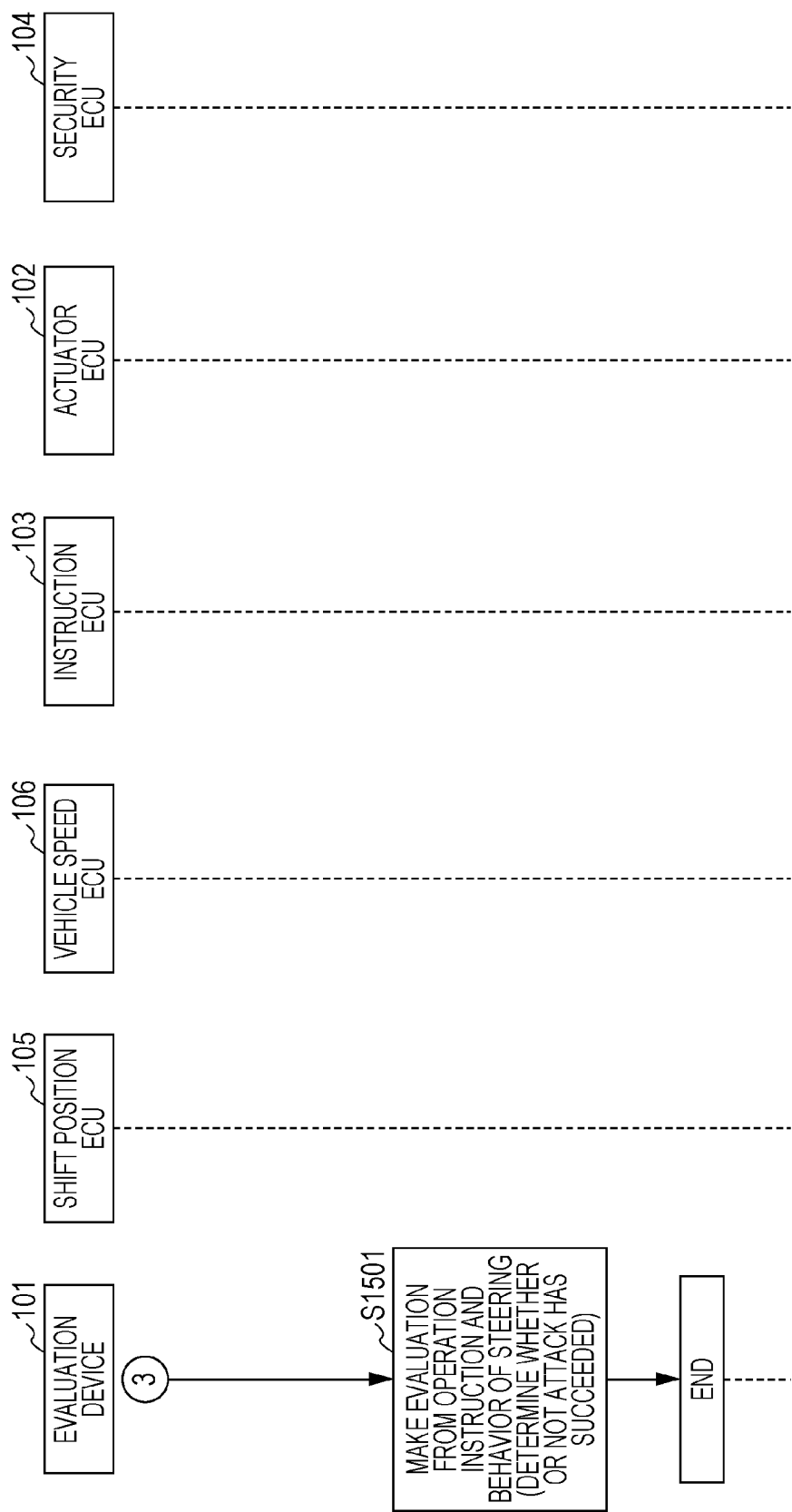
FIG. 15 is a sequence diagram illustrating the operation example 3 of the evaluation system.

FIGS. 13 through 15 are sequence diagrams each illustrating operation (the operation example 3) of the evaluation system 10 for evaluating the electronic control system 11 in which the security ECU 104 is provided (see FIG. 1). The sequence diagram illustrated in FIG. 13 continues to the sequence diagram illustrated in FIG. 14. The sequence diagram illustrated in FIG. 14 continues to the sequence diagram illustrated in FIG. 15. In the operation example 3, the evaluation device 101 tries to make the actuator ECU 102 have false recognition by an attack.

The shift position ECU 105 transmits a CAN message indicative of a current shift position (drive (D)) to the CAN bus 20 (Step S801), and the actuator ECU 102 receives the CAN message indicative of the shift position transmitted over the CAN bus 20 (Step S802).

The evaluation device 101 transmits, to the CAN bus 20, a CAN message indicative of a false shift position (reverse (R)) disguising the current shift position in accordance with the attack procedure information 108 immediately after transmission of the CAN message indicative of the shift position (drive (D)) to the CAN bus 20 (Step S803). As a result, the actuator ECU 102 receives the CAN message indicative of the shift position transmitted over the CAN bus 20 and falsely recognizes that the current shift position is reverse (R) (Step S804).

The vehicle speed ECU 106 transmits a CAN message indicative of a current vehicle speed (30 km/h) to the CAN bus 20 (Step S805), and the actuator ECU 102 receives the CAN message indicative of the vehicle speed transmitted over the CAN bus 20 (Step S806).

The evaluation device 101 transmits, to the CAN bus 20, a CAN message indicative of a false vehicle speed (0 km/h) that disguises the current vehicle speed immediately after transmission of the CAN message indicative of the vehicle speed (30 km/h) to the CAN bus 20 (Step S807). As a result, the actuator ECU 102 receives the CAN message indicative of the vehicle speed transmitted over the CAN bus 20 and falsely recognizes the current vehicle speed as 0 km/h (Step S808).

The instruction ECU 103 transmits, to the CAN bus 20, a CAN message indicating that the parking assistance function is currently invalid (flag: 0) (Step S901), and the actuator ECU 102 receives the CAN message concerning a valid/invalid state of the parking assistance function transmitted over the CAN bus 20 (Step S902).

The evaluation device 101 transmits, to the CAN bus 20, a CAN message indicating that the parking assistance function is currently valid (flag: 1) immediately after transmission of the CAN message indicating that the parking assistance function is currently invalid (flag: 0) to the CAN bus 20 (Step S903). In response to this, the security ECU 104 transmits an error frame and thereby invalidates the CAN message concerning a valid/invalid state of the parking assistance function transmitted to the CAN bus 20 by the evaluation device 101 in Step S903 in a case where it is determined that the CAN message is an unauthorized CAN message (Step S1401). The actuator ECU 102, which is free from the influence of the CAN message thus invalidated, does not transmit a control signal (steering operation instruction) to the actuator 107 (steering) 107. As a result, the actuator 107 (steering) does not perform any particular operation.

The evaluation device 101 confirms that the actuator ECU 102 has not transmitted a control signal (steering operation instruction) to the actuator 107 (steering) (Step S1402), confirms that the actuator 107 (steering) is not operating (Step S1403), and determines that the defense (security) has succeeded (i.e., the attack has failed) in a case where it is confirmed that the actuator ECU 102 has not transmitted a control signal and that the actuator 107 (steering) is not operating (Step S1501). The evaluation device 101 may evaluate the security by using only one of these results of confirmation, for example, may determine that the defense has succeeded in a case where only one of the absence of transmission of a control signal from the actuator ECU 102 to the actuator 107 (steering) and the absence of operation of the actuator 107 (steering) is confirmed.

1.8.4 Operation Example 4 of Evaluation System 10

Figure 16:
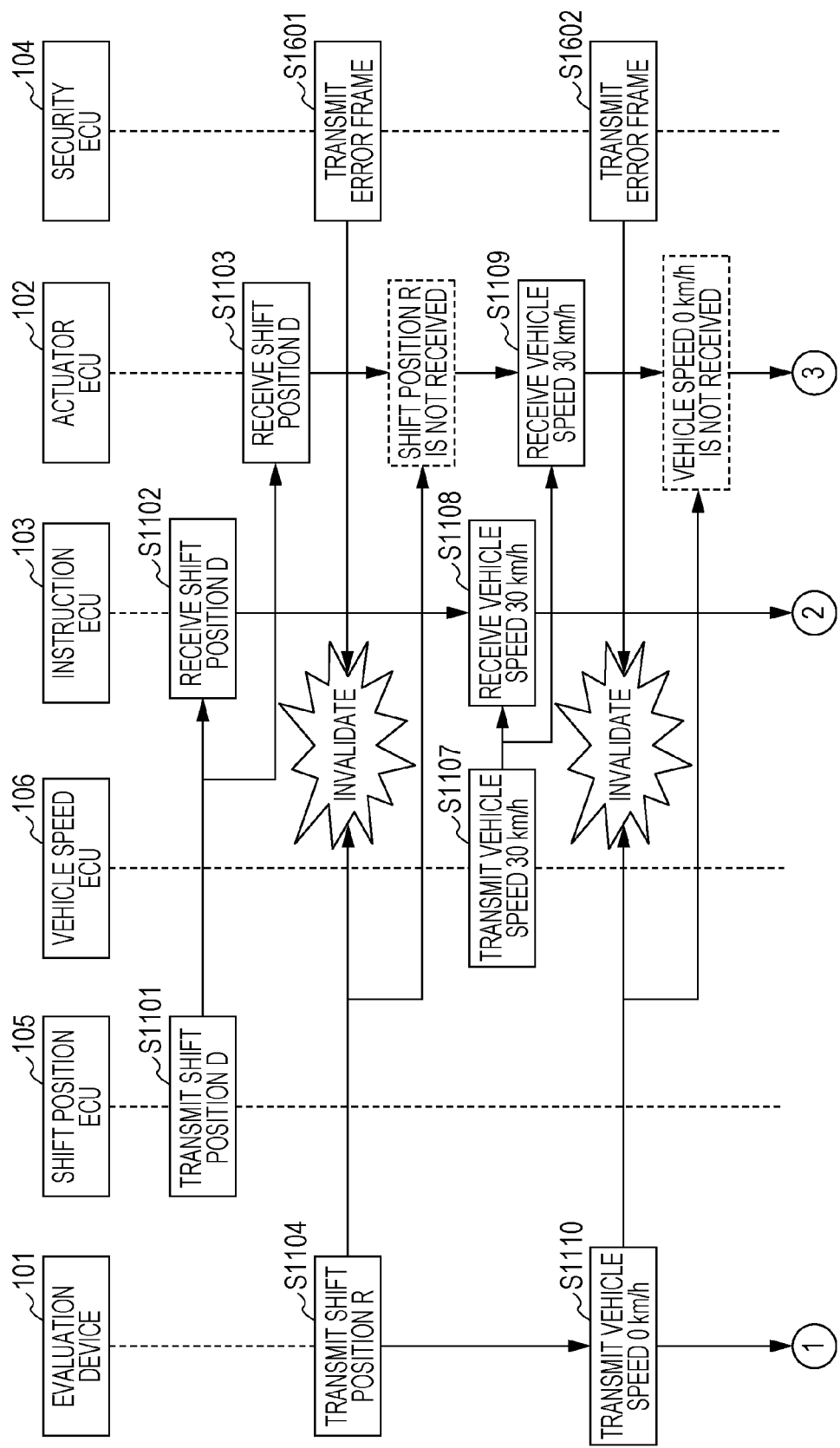
FIG. 16 is a sequence diagram illustrating an operation example 4 of the evaluation system.
Figure 17:
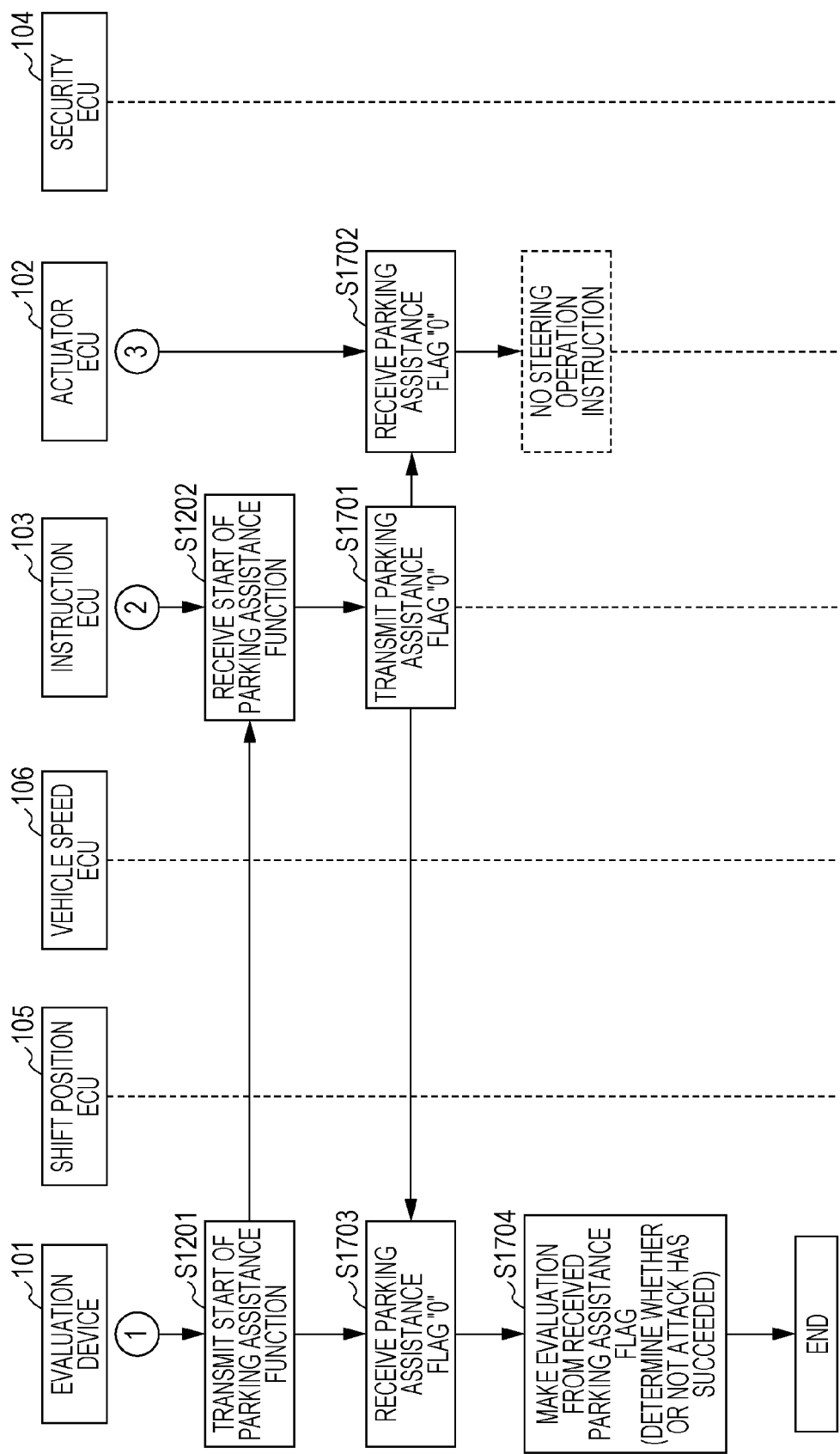
FIG. 17 is a sequence diagram illustrating the operation example 4 of the evaluation system.

FIGS. 16 and 17 are sequence diagrams each illustrating operation (operation example 4) of the evaluation system 10 for evaluating the electronic control system 11 in which the security ECU 104 is provided (see FIG. 1). The sequence diagram illustrated in FIG. 16 continues to the sequence diagram illustrated in FIG. 17. In the operation example 4, the evaluation device 101 tries to make the instruction ECU 103 have false recognition by an attack.

The shift position ECU 105 transmits, to the CAN bus 20, a CAN message indicative of a current shift position (drive (D)) (Step S1101), and the instruction ECU 103 receives the CAN message indicative of the shift position transmitted over the CAN bus 20 (Step S1102). The actuator ECU 102 also receives the CAN message indicative of the shift position transmitted over the CAN bus 20 (Step S1103).

The evaluation device 101 transmits, to the CAN bus 20, a CAN message indicative of a false shift position (reverse (R)) that disguises the current shift position in accordance with the attack procedure information 108 immediately after transmission of the CAN message indicative of the shift position (drive (D)) to the CAN bus 20 (Step S1104). In response to this, the security ECU 104 transmits an error frame and thereby invalidates the CAN message indicative of the shift position (reverse (R)) transmitted to the CAN bus 20 by the evaluation device 101 in Step S1104 in a case where it is determined that the CAN message is an unauthorized CAN message (Step S1601).

The vehicle speed ECU 106 transmits a CAN message indicative of a current vehicle speed (30 km/h) to the CAN bus 20 (Step S1107), and the instruction ECU 103 receives the CAN message indicative of the vehicle speed transmitted over the CAN bus 20 (Step S1108). The actuator ECU 102 also receives the CAN message indicative of the vehicle speed transmitted over the CAN bus 20 (Step S1109).

The evaluation device 101 transmits, to the CAN bus 20, a CAN message indicative of a false vehicle speed (0 km/h) that disguises the current vehicle speed immediately after transmission of the CAN message indicative of the vehicle speed (30 km/h) to the CAN bus 20 (Step S1110). In response to this, the security ECU 104 transmits an error frame and thereby invalidates the CAN message indicative of the vehicle speed (0 km/h) transmitted to the CAN bus 20 by the evaluation device 101 in Step S1110 in a case where it is determined that the CAN message is an unauthorized CAN message (Step S1602).

The evaluation device 101 transmits a CAN message indicative of start of the parking assistance function to the CAN bus 20 (Step S1201), and the instruction ECU 103 receives the CAN message concerning start of the parking assistance function (the CAN message indicative of start of the parking assistance function) transmitted over the CAN bus 20 (Step S1202).

Then, the instruction ECU 103 transmits, to the CAN bus 20, a CAN message (i.e., a CAN message indicative of a valid/invalid state of the parking assistance function) indicating that the parking assistance function is invalid (flag: 0) (Step S1701) because no false shift position and vehicle speed are received and the certain condition for execution of the parking assistance function is not satisfied. As a result, the actuator ECU 102 receives the CAN message concerning a valid/invalid state of the parking assistance function transmitted over the CAN bus, recognizes that the parking assistance function is currently invalid (Step S1702), and does not transmit a control signal (steering operation instruction) to the actuator 107 (steering).

The evaluation device 101 receives (monitors) the CAN message (flag: 0) concerning a valid/invalid state of the parking assistance function transmitted to the CAN bus by the instruction ECU 103 (Step S1703). The evaluation device 101 evaluates security of the electronic control system 11 (e.g., whether or not the attack has succeeded) by comparing the contents of the received CAN message concerning a valid/invalid state of the parking assistance function with a value expected as a result of the attack (Step S1704). The evaluation device 101 determines that a control instruction frame for controlling the actuator 107 (steering) has not been detected and thus determines that the defense (security) has succeeded, for example, in a case where the flag of the received CAN message concerning a valid/invalid state of the parking assistance function is not a flag value (1), which is a value expected as a result of the attack.

Modifications

Embodiment 1 has been described above as an illustrative example of the technique according to the present disclosure. However, the technique according to the present disclosure is not limited to this and is also applicable to an embodiment obtained by making changes, substitutions, additions, omissions, and the like as appropriate. For example, the following modifications are also encompassed within the aspect of the present disclosure.

(1) In the above embodiment, an example in which the evaluation device 101 attacks the electronic control system 11 by transmitting a CAN message (a CAN message indicative of false information) has been described. However, the evaluation device 101 may attack the electronic control system 11 by any method. The evaluation device 101 may attack the electronic control system 11 by a method other than transmission of a CAN message. For example, the evaluation device 101 may make an ECU have false recognition by replacing, with false information, sensing information of a sensor connected via a signal line to various ECUs in the electronic control system 11 to be evaluated.

(2) In the above description, it is assumed that the various ECUs and actuators in the electronic control system 11 are real ones (actual ones). However, the various ECUs in the electronic control system 11 to be evaluated by the evaluation system 10 may be simulated ECUs (e.g., a computer that executes software that simulates functions, behaviors, and the like of the ECUs) that simulate the real ECUs instead of the real ECUs (e.g., ECUs mounted on an evaluation board or ECUs that are products). Similarly, the electronic control system 11 to be evaluated may include simulated actuators (e.g., a computer that executes simulation software that simulates operation of the actuators) that simulate the real actuators instead of the real actuators (e.g., steering, an accelerator, a brake). That is, an object to be evaluated by the evaluation system 10 need just be an electronic control system that includes an actuator unit that is either a real actuator or a simulated actuator. In a case where the actuator unit is a simulated actuator, the actuator monitoring unit 205 may observe the actuator unit by checking various parameters used for simulation, for example, by using an output function or the like of the simulation software, and the signal monitoring unit 204 may observe the actuator unit, for example, by checking parameters and the like input to the simulation software. That is, in a case where the actuator unit is a simulated actuator, the monitoring unit 200 may detect operation of the actuator unit by observing a change of predetermined data (e.g., contents in a predetermined memory region of the computer or output contents that correspond to a physical amount changed by operation of the actuator) concerning the simulation software (program) in the computer.

(3) In the above embodiment, an example in which the evaluation device 101 is a single device connected to the CAN bus 20 has been described. Alternatively, the evaluation device 101 may be a plurality of separate devices. For example, the evaluation device 101 may be separated into a transmission device that transmits a CAN message for an attack in accordance with the attack procedure information 108 and a monitoring device that monitors a CAN message transmitted over the CAN bus 20, a control signal that is output from the actuator ECU 102, behavior of the actuator 107, and the like.

(4) In the above embodiment, the electronic control system 11 that includes an on-board network realized by the CAN bus 20 is illustrated as an example of an object to be evaluated by the evaluation system 10. However, a network to which a message for an attack is transmitted or which is monitored by the evaluation device 101 in the evaluation system 10 need not necessarily be an on-board network and may be a network other than the CAN bus 20 over which communication is performed according to a CAN protocol. For example, an object to be evaluated by the evaluation system 10 may be a network such as a robot or industrial equipment or a network communication system of other types. The CAN protocol should be broadly interpreted as encompassing CANOpen used, for example, for an embedded system used in an automation system or derivative protocols such as time-triggered CAN (TTCAN) and CAN with flexible data rate (CANFD). Furthermore, communication protocols other than the CAN protocol such as Ethernet (Registered Trademark), MOST (Registered Trademark), FlexRay (Registered Trademark), and a local interconnect network (LIN) may be used in a network system to be evaluated. Furthermore, a system including complex network combining networks according to various protocols may be attacked and monitored as an object to be evaluated by the evaluation device 101.

(5) In the above embodiment, an example in which the evaluation device 101 attacks an object to be evaluated by transmitting a CAN message indicative of false information has been described. Alternatively, the evaluation device 101 may attack an object to be evaluated by falsifying part of a CAN message transmitted, for example, by the shift position ECU 105, the vehicle speed ECU 106, or the instruction ECU 103 over the CAN bus 20.

(6) The evaluation device 101 may make an evaluation, for example, by attacking, as an object to be evaluated, the electronic control system 11 that corresponds to part of the on-board network system. In this case, the evaluation device 101 may attack the object to be evaluated while transmitting an authorized CAN message, which is transmitted in a steady state, to the on-board network that is not included in the object to be evaluated in order to simulate part of the on-board network system that is not included in the object to be evaluated (part that constitutes an evaluation environment). In this case, for example, the evaluation device 101 may evaluate the object to be evaluated by confirming that the authorized CAN message that is not relevant is not invalidated in a case where the security ECU 104 in the object to be evaluated detects and invalidates the unauthorized CAN message. Alternatively, the evaluation device 101 may evaluate the object to be evaluated, for example, by confirming that a measure against the attack has caused no adverse effect (e.g., a long communication delay) on transmission and reception of the authorized CAN message in the steady state in a case where a security function (e.g., addition of a message authentication code (MAC) to the CAN message or MAC verification) for a measure against the attack other than detection and invalidation of an unauthorized CAN message is introduced.

(7) The evaluation device 101 may make, as an evaluation of security (e.g., attack resistance) of an object to be evaluated, an evaluation such as determination of the presence or absence of attack resistance on the basis of the number or the percentage of unauthorized CAN messages that have slipped through the defense. The evaluation device 101 may use a threshold value that defines, for example, an upper limit of the number or the percentage of unauthorized CAN messages in order to determine the presence or absence of attack resistance. This threshold value may be arbitrarily set in the evaluation device 101 or may be changed (adjusted), for example, in accordance with evaluation results in a case where an evaluation is repeatedly conducted. The evaluation device 101 may calculate a success rate (e.g., success frequency) of attacks. As described above, the evaluation device 101 may evaluate, for example, whether or not each of a plurality of defense functions works or how effectively the defense function has worked instead of alternative determination as to whether or not an attack has succeeded or whether or not defense has succeeded. The evaluation device 101 may be arranged such that the transmitting unit 201a repeats, plural times, an attack pattern of transmitting a plurality of CAN messages to the CAN bus 20 in the transmission order indicated by the attack procedure information 108 and the evaluating unit 206 makes an evaluation so that a result of the evaluation differs depending on whether or not a result of monitoring by the monitoring unit 200 has been changed by the repetition of the attack pattern. A result of evaluation by the evaluating unit 206 of the evaluation device 101 may be not only recorded on a storage medium such as a memory by the evaluation device 101, but also output to an outside of the evaluation device 101 (e.g., a result of evaluation may be displayed or information indicative of a result of evaluation may be transmitted). For example, the evaluating unit 206 may output, as a result of evaluation, information indicating whether or not an electronic control system to be evaluated has attack resistance.

(8) The security function including the security ECU 104 in the electronic control system 11 to be evaluated may be recording of log information (e.g., a history of reception of CAN messages) concerning detection of an unauthorized act. In this case, the evaluation device 101 may evaluate security by comparing the log information and an expected value concerning an attack held by the evaluation device 101 and thereby determining whether or not the attack has succeeded or calculating, for example, the percentage of success of the attack.

(9) In the above embodiment, the electronic control system 11 may include the independent security ECU 104 as a security function. Alternatively, all of or part of a plurality of ECUs that perform communication may have a security function. Alternatively, a security function may be realized by being distributed among a plurality of ECUs.

(10) In the above example, an example in which the evaluation device 101 is directly connected to a bus in the electronic control system 11 to be evaluated has been described. Alternatively, a relay device such as a gateway may be interposed between the evaluation device 101 and the object to be evaluated. For example, the evaluation device 101 may evaluate security (e.g., attack resistance) of the object to be evaluated, for example, by transmitting a CAN message for an attack after mutual authentication or one-way authentication with the gateway, causing the gateway to transfer the CAN message to the CAN bus 20, and obtaining a CAN message from the CAN bus 20 via the gateway.

(11) The evaluation device 101 may indirectly check operation (behavior) of the actuator 107 by monitoring a CAN message concerning notification of a state of the actuator 107 (e.g., a current angle of steering, the amount of displacement of an accelerator or a brake, or rotational speed of an engine) transmitted to the CAN bus 20 by the actuator ECU 102 instead of monitoring the actuator 107 by using the actuator monitoring unit 205.

(12) In the above embodiment, the evaluation device 101 and the various ECUs are, for example, devices including a processor, a digital circuit such as a memory, an analog circuit, a communication circuit, and the like. However, the evaluation device 101 and the various ECUs may include other hardware constituent elements such as a display, a keyboard, and a mouse. The functions of the evaluation device 101 and the various ECUs may be realized by dedicated hardware (e.g., a digital circuit) instead of realizing the functions by software by causing a processor to execute a control program stored in a memory. For example, each of the functional blocks of the evaluation device 101, specifically, the CAN bus monitoring unit 203, the signal monitoring unit 204, the actuator monitoring unit 205, the transmitting receiving unit 201, the holding unit 202, the evaluating unit 206, and the control unit 207 may be an integrated circuit. For example, each of the functional blocks of the actuator ECU 102, specifically the transmitting receiving unit 301, the instruction transmitting unit 302, the state obtaining unit 303, the determining unit 304, and the control unit 305 may be an integrated circuit. For example, each of the functional blocks of the instruction ECU 103, specifically the transmitting receiving unit 401, the determining unit 402, the calculating unit 403, and the control unit 404 may be an integrated circuit. For example, each of the functional blocks of the security ECU 104, specifically the transmitting receiving unit 501, the CAN bus monitoring unit 502, and the control unit 503 may be an integrated circuit. For example, each of the functional blocks of the shift position ECU 105 or the vehicle speed ECU 106, specifically, the transmitting receiving unit 601, the state obtaining unit 602, and the control unit 603 may be an integrated circuit.

(13) All or a part of constituent elements that constitute each of the devices (e.g., the evaluation device 101 and the various ECUs) according to the above embodiment may be a single system large scale integration (LSI). The system LSI is a super-multifunctional LSI including a plurality of constituent parts integrated onto one chip and is specifically a computer system including a microprocessor, a ROM, a RAM, and the like. A computer program is recorded on the RAM. The microprocessor operates in accordance with the computer program, and thereby the system LSI accomplishes a function thereof. The constituent elements that constitute each of the devices may be individually integrated into respective chips or part of or all of the constituent elements may be integrated into one chip. The name used here is system LSI, but it may also be called IC, LSI, super LSI, or ultra LSI depending on the degree of integration. Furthermore, a method of integration is not limited to LSI, and a dedicated circuit or a general-purpose processor may be used. A field programmable gate array (FPGA) that can be programmed after manufacturing an LSI or a reconfigurable processor that allows reconfiguration of the connection or setup of circuit cells inside the LSI can be used. Furthermore, if an integration technology that replaces LSI as a result of advancement of the semiconductor technology or another derivative technology, the functional blocks may be integrated by using such a technology. One possibility is application of a biotechnology.

(14) Part of or all of the constituent elements that constitute each of the devices may be provided as an IC card detachably attached to the device or a stand-alone module. The IC card or the module is a computer system including a microprocessor, a ROM, a RAM, and the like. The IC card or the module may include the aforementioned super-multifunctional LSI. The microprocessor operates in accordance with a computer program, and thereby the IC card or the module accomplishes a function thereof. The IC card or the module may have tamper resistance.

(15) An aspect of the present disclosure may be an evaluation method that includes all of or part of the processing procedures illustrated, for example, in FIGS. 8 through 17. For example, the evaluation method is an evaluation method for evaluating security of the electronic control system 11 including a plurality of ECUs that perform communication over the CAN bus 20, including holding the attack procedure information 108 indicative of contents and a transmission order of a plurality of frames and transmitting the plurality of frames to the CAN bus 20 in the transmission order indicated by the attack procedure information 108 (e.g., Steps S803, S807, S903, S1104, S1110, and S1201), directly or indirectly monitoring, upon transmission of the plurality of frames to the CAN bus 20, an actuator unit (e.g., the actuator 107) that is controlled by any of the plurality of ECUs (e.g., Steps S1001, S1002, and S1207), and makes an evaluation on the basis of a monitoring result (e.g., Steps S1003 and S1208). Another aspect of the present disclosure may be a computer program that causes a computer to perform the processes of this evaluation method or may be a digital signal representing the computer program. Another aspect of the present disclosure may be a computer-readable recording medium, such as a flexible disc, a hard disc, a CD-ROM, an MO, a DVD, a DVD-ROM, a DVD-RAM, a Blu-ray (Registered trademark) disc (BD), or a semiconductor memory, in which the computer program or the digital signal is stored in a computer-readable manner or may be the digital signal recorded in these recording media. Another aspect of the present disclosure may be the computer program or the digital signal transmitted over an electrical communication line, a wired or wireless communication line, a network represented by the Internet, data broadcasting, or the like. Another aspect of the present disclosure may be a computer system including a microprocessor and a memory, the memory recording thereon the computer program, and the microprocessor operating in accordance with the computer program. Alternatively, the present disclosure may be implemented by another independent computer system by transferring the program or the digital signal recorded on the aforementioned recording medium or by transferring the program or the digital signal over the aforementioned network or the like.

(16) Any combinations of the constituent elements and functions in the above embodiment and the modifications are encompassed within the scope of the present disclosure.

The present disclosure is applicable, for example, for evaluation of whether or not a security technology applied to an electronic control system is capable of properly defending against an attack.

What is claimed is:

1. An evaluation device for evaluating security of an electronic control system in which a plurality of electronic control units are connected to a bus used for communication, the electronic control system including an actuator controlled by any of the plurality of electronic control units and having a defense against an attack of at least one unauthorized frame against the actuator, the evaluation device comprising:
 a recording medium that holds attack procedure information indicative of contents of a plurality of frames which includes the at least one unauthorized frame to attack the actuator and of a transmission order of the plurality of frames;

a transmitter that transmits the plurality of frames to the bus in the transmission order indicated by the attack procedure information;

a monitor that monitors a physical amount changed by operation of the actuator; and an evaluator that makes the evaluation on basis of the physical amount changed by operation of the actuator obtained by the monitor when the transmitter transmits the plurality of frames to the bus, wherein when the transmitter transmits the at least one unauthorized frame and the actuator operates according to the least one unauthorized frame to change the physical amount monitored by the monitor, the evaluator determines that the defense of the electronic control system against the attack of the at least one unauthorized frame on the actuator has failed, and when the transmitter transmits the at least one unauthorized frame and the actuator does not operate according to the at least one unauthorized frame to not change the physical amount monitored by the monitor, the evaluator determines that the defense of the electronic control system against the attack of the at least one unauthorized frame on the actuator has succeeded, wherein the evaluator further counts a number times the defense has failed and a number of times the defense has succeeded, when the number of times the defense has failed is above a predetermined threshold, or the percentage of times the defense has failed exceeds a predetermined percentage, the evaluator determines that there is an absence of attack resistance, and, when the number of times the defense has failed is below the predetermined threshold, or the percentage of times the defense has failed falls below the predetermined percentage, the evaluator determines that there is a presence of attack resistance.

2. The evaluation device according to claim 1, wherein the plurality of electronic control units perform communication over the bus in accordance with a controller area network (CAN) protocol.

3. The evaluation device according to claim 1, wherein the monitor detects, as the monitoring of the actuator, transmission of a control instruction frame to the bus, the control instruction frame instructing one of the plurality of electronic control units to control the actuator; and the evaluator makes the evaluation so that an evaluation result differs depending on whether or not transmission of the control instruction frame over the bus has been detected by the monitor within a certain period after transmission of one or more of the plurality of frames from the transmitter to the bus.

4. The evaluation device according to claim 1, wherein the monitor detects, as the monitoring of the actuator, input of a control signal to the actuator from one of the plurality of electronic control units; and the evaluator makes the evaluation so that an evaluation result differs depending on whether or not input of the control signal to the actuator has been detected by the monitor within a certain period after transmission of one or more of the plurality of frames from the transmitter to the bus.

5. The evaluation device according to claim 1, wherein the monitor detects, as the monitoring of the actuator, operation of the actuator; and the evaluator makes the evaluation so that an evaluation result differs depending on whether or not operation of the actuator has been detected by the monitor within a certain period after transmission of one or more of the plurality of frames from the transmitter to the bus.

6. The evaluation device according to claim 5, wherein the actuator has a computer that executes a program simulating operation of the actuator; and the monitor detects operation of the actuator by observing a change of predetermined data concerning the program in the computer.

7. The evaluation device according to claim 1, wherein the attack procedure information further indicates a transmission interval between the plurality of frames; and the transmitter transmits the plurality of frames to the bus in accordance with the transmission order and the transmission interval indicated by the attack procedure information.

8. The evaluation device according to claim 1, wherein the evaluator outputs, as an evaluation result, information indicating whether or not the electronic control system has attack resistance.

9. The evaluation device according to claim 1, wherein the transmitter repeats, plural times, an attack pattern of transmitting the plurality of frames to the bus in the transmission order indicated by the attack procedure information; and the evaluator makes the evaluation so that an evaluation result differs depending on whether or not the monitoring result has been changed by the repetition of the attack pattern.

10. An evaluation system for evaluating security of an electronic control system including a plurality of electronic control units that perform communication over a bus, the electronic control system including an actuator controlled by any of the plurality of electronic control units and having a defense against an attack of at least one unauthorized frame against the actuator, the evaluation system comprising:

a recording medium that holds attack procedure information indicative of contents of a plurality of frames which includes the at least one unauthorized frame to attack the actuator and of a transmission order of the plurality of frames;

a transmitter that transmits the plurality of frames to the bus in the transmission order indicated by the attack procedure information;

a monitor that monitors a physical amount changed by operation of the actuator; and an evaluator that makes the evaluation on basis of the physical amount changed by operation of the actuator obtained by the monitor when the transmitter transmits the plurality of frames to the bus, wherein when the transmitter transmits the at least one unauthorized frame and the actuator operates according to the least one unauthorized frame to change the physical amount monitored by the monitor, the evaluator determines that the defense of the electronic control system against the attack of the at least one unauthorized frame on the actuator has failed, and when the transmitter transmits the at least one unauthorized frame and the actuator does not operate according to the at least one unauthorized frame to not change the physical amount monitored by the monitor, the evaluator determines that the defense of the electronic control system against the attack of the at least one unauthorized frame on the actuator has succeeded, and wherein the evaluator further counts a number times the defense has failed and a number of times the defense has succeeded, when the number of times the defense has failed is above a predetermined threshold, or the percentage of times the defense has failed exceeds a predetermined percentage, the evaluator determines that there is an absence of attack resistance, and, when the number of times the defense has failed is below the predetermined threshold, or the percentage of times the defense has failed falls below the predetermined percentage, the evaluator determines that there is a presence of attack resistance.

11. An evaluation method for evaluating security of an electronic control system including a plurality of electronic control units that perform communication over a bus, the electronic control system including an actuator controlled by any of the plurality of electronic control units and having a defense against an attack of at least one unauthorized frame against the actuator, the evaluation method comprising:

holding attack procedure information indicative of contents of a plurality of frames which includes the at least one unauthorized frame to attack the actuator and of a transmission order of the plurality of frames;

transmitting with a transmitter the plurality of frames to the bus in the transmission order indicated by the attack procedure information;

monitoring with a monitor a physical amount changed by operation of the actuator; and making an evaluation with an evaluator on basis of the physical amount changed by operation of the actuator obtained by the monitoring, wherein when the transmitter transmits the at least one unauthorized frame and the actuator operates according to the least one unauthorized frame to change the physical amount monitored by the monitor, the evaluator determines that the defense of the electronic control system against the attack of the at least one unauthorized frame on the actuator has failed, and when the transmitter transmits the at least one unauthorized frame and the actuator does not operate according to the at least one unauthorized frame to not change the physical amount monitored by the monitor, the evaluator determines that the defense of the electronic control system against the attack of the at least one unauthorized frame on the actuator has succeeded, and wherein the evaluator further counts a number times the defense has failed and a number of times the defense has succeeded, when the number of times the defense has failed is above a predetermined threshold, or the percentage of times the defense has failed exceeds a predetermined percentage, the evaluator determines that there is an absence of attack resistance, and, when the number of times the defense has failed is below the predetermined threshold, or the percentage of times the defense has failed falls below the predetermined percentage, the evaluator determines that there is a presence of attack resistance.

12. The evaluation method according to claim 11, wherein the plurality of electronic control units perform communication over the bus in accordance with controller area network (CAN) protocol; and the evaluation method further comprises making the evaluation so that an evaluation result differs depending on whether or not transmission of a control instruction frame to the bus has been detected within a certain period after transmission of one or more of the plurality of frames to the bus, the control instruction frame instructing one of the plurality of electronic control units to control the actuator.

13. An evaluation device for evaluating security of an electronic control system in which a plurality of electronic control units are connected to a bus used for communication, the electronic control system including an actuator controlled by any of the plurality of electronic control units and having a defense against an attack of at least one unauthorized frame against the actuator, the evaluation device comprising:

a recording medium that holds attack procedure information indicative of contents of a plurality of frames which includes the at least one unauthorized frame to attack the actuator and of a transmission order of the plurality of frames;

a transmitter that transmits the plurality of frames to the bus in the transmission order indicated by the attack procedure information;

a monitor that monitors a physical amount changed by operation of the actuator; and an evaluator that makes the evaluation on basis of the physical amount changed by operation of the actuator obtained by the monitor when the transmitter transmits the plurality of frames to the bus, wherein when the transmitter transmits the at least one unauthorized frame and the actuator operates according to the least one unauthorized frame to change the physical amount monitored by the monitor, the evaluator determines that the defense of the electronic control system against the attack of the at least one unauthorized frame on the actuator has failed, and when the transmitter transmits the at least one unauthorized frame and the actuator does not operate according to the at least one unauthorized frame to not change the physical amount monitored by the monitor, the evaluator determines that the defense of the electronic control system against the attack of the at least one unauthorized frame on the actuator has succeeded, wherein the defense includes a plurality of defense functions, the monitor further monitors whether or not each of a plurality of defense functions works, when the transmitter transmits the at least one unauthorized frame and the percentage of times the defense functions work falls below a predetermined percentage, the evaluator determines that the defense of the electronic control system against the attack of the at least one unauthorized frame on the actuator has failed, and when the transmitter transmits the at least one unauthorized frame and the percentage of times the defense functions work exceeds the predetermined percentage, the evaluator determines that the defense of the electronic control system against the attack of the at least one unauthorized frame on the actuator has succeeded.

14. An evaluation system for evaluating security of an electronic control system including a plurality of electronic control units that perform communication over a bus, the electronic control system including an actuator controlled by any of the plurality of electronic control units and having a defense against an attack of at least one unauthorized frame against the actuator, the evaluation system comprising:

a recording medium that holds attack procedure information indicative of contents of a plurality of frames which includes the at least one unauthorized frame to attack the actuator and of a transmission order of the plurality of frames;

a transmitter that transmits the plurality of frames to the bus in the transmission order indicated by the attack procedure information;

a monitor that monitors a physical amount changed by operation of the actuator; and an evaluator that makes the evaluation on basis of the physical amount changed by operation of the actuator obtained by the monitor when the transmitter transmits the plurality of frames to the bus, wherein when the transmitter transmits the at least one unauthorized frame and the actuator operates according to the least one unauthorized frame to change the physical amount monitored by the monitor, the evaluator determines that the defense of the electronic control system against the attack of the at least one unauthorized frame on the actuator has failed, and when the transmitter transmits the at least one unauthorized frame and the actuator does not operate according to the at least one unauthorized frame to not change the physical amount monitored by the monitor, the evaluator determines that the defense of the electronic control system against the attack of the at least one unauthorized frame on the actuator has succeeded, and wherein the defense includes a plurality of defense functions, the monitor further monitors whether or not each of a plurality of defense functions works, when the transmitter transmits the at least one unauthorized frame and the percentage of times the defense functions work falls below a predetermined percentage, the evaluator determines that the defense of the electronic control system against the attack of the at least one unauthorized frame on the actuator has failed, and when the transmitter transmits the at least one unauthorized frame and the percentage of times the defense functions work exceeds the predetermined percentage, the evaluator determines that the defense of the electronic control system against the attack of the at least one unauthorized frame on the actuator has succeeded.

15. An evaluation method for evaluating security of an electronic control system including a plurality of electronic control units that perform communication over a bus, the electronic control system including an actuator controlled by any of the plurality of electronic control units and having a defense against an attack of at least one unauthorized frame against the actuator, the evaluation method comprising:

holding attack procedure information indicative of contents of a plurality of frames which includes the at least one unauthorized frame to attack the actuator and of a transmission order of the plurality of frames;

transmitting with a transmitter the plurality of frames to the bus in the transmission order indicated by the attack procedure information;

monitoring with a monitor a physical amount changed by operation of the actuator; and making an evaluation with an evaluator on basis of the physical amount changed by operation of the actuator obtained by the monitoring, wherein when the transmitter transmits the at least one unauthorized frame and the actuator operates according to the least one unauthorized frame to change the physical amount monitored by the monitor, the evaluator determines that the defense of the electronic control system against the attack of the at least one unauthorized frame on the actuator has failed, and when the transmitter transmits the at least one unauthorized frame and the actuator does not operate according to the at least one unauthorized frame to not change the physical amount monitored by the monitor, the evaluator determines that the defense of the electronic control system against the attack of the at least one unauthorized frame on the actuator has succeeded, and wherein the defense includes a plurality of defense functions, the monitor further monitors whether or not each of a plurality of defense functions works, when the transmitter transmits the at least one unauthorized frame and the percentage of times the defense functions work falls below a predetermined percentage, the evaluator determines that the defense of the electronic control system against the attack of the at least one unauthorized frame on the actuator has failed, and when the transmitter transmits the at least one unauthorized frame and the percentage of times the defense functions work exceeds the predetermined percentage, the evaluator determines that the defense of the electronic control system against the attack of the at least one unauthorized frame on the actuator has succeeded.

* * * * *